(12) United States Patent
Yang et al.

(10) Patent No.: US 9,813,787 B2
(45) Date of Patent: Nov. 7, 2017

(54) LINK DETERMINING METHOD, APPARATUS, AND SYSTEM FOR OPTICAL PACKET SWITCHING SYSTEM

(71) Applicant: HUAWEI TECHNOLOGIES CO., LTD., Shenzhen (CN)

(72) Inventors: Xiaoling Yang, Shenzhen (CN); Huixiao Ma, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/293,690

(22) Filed: Oct. 14, 2016

(65) Prior Publication Data

US 2017/0034605 A1 Feb. 2, 2017

Related U.S. Application Data

(63) Continuation of application No. PCT/CN2014/094313, filed on Dec. 19, 2014.

(30) Foreign Application Priority Data

Apr. 15, 2014 (CN) .......................... 2014 1 0151573

(51) Int. Cl.
*H04B 10/00* (2013.01)
*H04Q 11/00* (2006.01)
(Continued)

(52) U.S. Cl.
CPC ......... *H04Q 11/0066* (2013.01); *H04L 41/06* (2013.01); *H04L 41/0677* (2013.01);
(Continued)

(58) Field of Classification Search
USPC ...................................... 398/43–57
See application file for complete search history.

(56) References Cited

U.S. PATENT DOCUMENTS 6,477,291 B1 * 11/2002 Ramadas ............ H04J 14/0212
385/17
7,145,704 B1 * 12/2006 Islam ................. G02B 26/0808
359/108
(Continued)

FOREIGN PATENT DOCUMENTS

CN          1756182 A      4/2006
CN          1980156 A      6/2007
(Continued)

OTHER PUBLICATIONS

International Search Report dated Mar. 24, 2015 in corresponding International Application No. PCT/CN2014/094313.
(Continued)

*Primary Examiner* — Agustin Bello
(74) *Attorney, Agent, or Firm* — Staas & Halsey LLP

(57) ABSTRACT

Embodiments of the present invention relate to the field of information technologies and disclose a link determining method, apparatus, and system for an optical packet switching system, which can reduce optical packet switching costs. The method includes: first, a control manager generates reference optical label information and an enabling signal, and sends the reference optical label information and the enabling signal to a link determining device; then, when the enabling signal is active, the link determining device determines, according to parsed-out actual optical label information and the received reference optical label information, whether an alarm signal is generated, and if it is determined that the alarm signal is generated, sends the alarm signal to the control manager; and finally, the control manager further determines, according to the received alarm signal, whether a link corresponding to the alarm signal is abnormal.

20 Claims, 17 Drawing Sheets

(51) Int. Cl.
*H04L 12/24* (2006.01)
*H04L 12/26* (2006.01)
*H04L 12/721* (2013.01)
*H04L 12/703* (2013.01)

(52) U.S. Cl.
CPC .......... *H04L 43/0817* (2013.01); *H04L 43/50* (2013.01); *H04Q 11/0062* (2013.01); *H04L 45/28* (2013.01); *H04L 45/62* (2013.01); *H04Q 2011/0073* (2013.01); *H04Q 2011/0077* (2013.01); *H04Q 2011/0083* (2013.01)

(56) References Cited

U.S. PATENT DOCUMENTS

| | | | | |
|---|---|---|---|---|
| 7,522,836 | B2 * | 4/2009 | Islam | G02B 26/0808 398/48 |
| 7,764,602 | B2 * | 7/2010 | Lemoine | H04J 3/14 370/225 |
| 9,112,638 | B2 * | 8/2015 | Reina | H04J 14/0284 |
| 2002/0030864 | A1 * | 3/2002 | Chaudhuri | H04J 14/0227 398/5 |
| 2002/0146006 | A1 * | 10/2002 | Chang | H04J 14/0227 370/390 |
| 2002/0146007 | A1 * | 10/2002 | Chang | H04J 14/0227 370/390 |
| 2003/0067919 | A1 * | 4/2003 | Qiao | H04L 47/24 370/392 |
| 2003/0228093 | A1 * | 12/2003 | Notani | H04J 14/0201 385/24 |
| 2004/0037558 | A1 * | 2/2004 | Beshai | H04Q 11/0005 398/57 |
| 2004/0193724 | A1 | 9/2004 | Dziong et al. | |
| 2004/0213229 | A1 * | 10/2004 | Chang | H04J 14/0227 370/390 |
| 2007/0150776 | A1 * | 6/2007 | Smith | G01R 13/0254 714/709 |
| 2007/0206946 | A1 * | 9/2007 | Beshai | H04Q 11/0005 398/4 |
| 2007/0223917 | A1 * | 9/2007 | Nagamine | H04L 41/046 398/1 |
| 2007/0292129 | A1 * | 12/2007 | Yan | H04B 10/032 398/5 |
| 2008/0240120 | A1 * | 10/2008 | Kusama | H04J 14/0227 370/400 |
| 2008/0240710 | A1 * | 10/2008 | Nishioka | H04B 10/03 398/5 |
| 2008/0285439 | A1 * | 11/2008 | Lemoine | H04J 3/14 370/221 |
| 2009/0190593 | A1 * | 7/2009 | Nomura | H04L 43/0829 370/394 |
| 2016/0094289 | A1 * | 3/2016 | Cohn | H04B 10/032 398/5 |
| 2017/0034605 | A1 * | 2/2017 | Yang | H04Q 11/0066 |

FOREIGN PATENT DOCUMENTS

| | | |
|---|---|---|
| EP | 1 422 968 A1 | 5/2004 |
| EP | 2 712 135 A1 | 3/2014 |

OTHER PUBLICATIONS

International Search Report dated Mar. 24, 2015 from International Patent Application No. PCT/CN2014/094313.
Extended European Search Report dated Apr. 11, 2017 from European Patent Application No. 14889778.9.

* cited by examiner

LINK DETERMINING METHOD, APPARATUS, AND SYSTEM FOR OPTICAL PACKET SWITCHING SYSTEM

CROSS-REFERENCE TO RELATED APPLICATIONS

This application is a continuation of International Application No. PCT/CN2014/094313, filed on Dec. 19, 2014, which claims priority to Chinese Patent Application No. 201410151573.4, filed on Apr. 15, 2014, The disclosures of the aforementioned applications are hereby incorporated by reference in their entireties.

TECHNICAL FIELD

The present invention relates to the field of information technologies, and in particular, to a link determining method, apparatus, and system for an optical packet switching system.

BACKGROUND

With mass application of new services such as multimedia and cloud computing, communication traffic double increases each year and users have increasingly high requirements for bandwidth. To meet requirements for fast network capacity increase and low latency, optical switching starts to be used in networks gradually. When an optical packet switching node in an optical packet switching system runs for a long time, some internal switch units of a core optical packet switch in the optical packet switching system deteriorate in performance due to reasons such as aging, and consequently, some links between an input port and an output port of the optical packet switch fail, and some optical packets cannot be switched to a correct output port. Therefore, in an optical switching process, it is necessary to determine whether a switching link corresponding to an optical packet is normal.

Currently, a circulator is added at each input port and each output port of an optical packet switch to implement that a test signal generated by a link determining device passes through the optical switch and returns to the link determining device. Specifically, first, the link determining device generates N different test signals, and couples these test signals to a circulator on an output side of the optical packet switch; then a circulator on an input side of the optical packet switch separates the test signals from an input signal, and transmits the test signals to the link determining device; and finally the link determining device compares the received test signals with an expected test signal to determine whether a corresponding switching link is normal.

However, if a circulator is added at each input port and each output port of the optical packet switch, a corresponding circulator needs to be added at each input port and each output port of the optical packet switch, and therefore, a large quantity of circulators are needed in the optical packet switching apparatus, which causes relatively high optical packet switching costs.

SUMMARY

Embodiments of the present invention provide a link determining method, apparatus, and system for an optical packet switching system, which can reduce optical packet switching costs.

Technical solutions used in the embodiments of the present invention are as follows:

According to a first aspect, an embodiment of the present invention provides a link determining method for an optical packet switching system, including:

parsing out, by a control manager, routing information carried in an optical label of an optical packet before switching;

generating, by the control manager, reference optical label information and an enabling signal according to the routing information;

sending, by the control manager, the reference optical label information and the enabling signal to a link determining device;

determining, by the control manager when the enabling signal is active, whether an alarm signal sent by the link determining device is received; and determining, by the control manager according to the alarm signal if the alarm signal sent by the link determining device is received, whether a link corresponding to the alarm signal is abnormal.

With reference to the first aspect, in a first possible implementation manner of the first aspect, the reference optical label information is at least one type of information included in various information types of the routing information; and the various information types of the routing information include source port information, destination port information, packet length information, or priority information.

With reference to the first aspect or the first possible implementation manner of the first aspect, in a second possible implementation manner of the first aspect, the enabling signal is used to trigger the link determining device to detect whether a link is abnormal.

With reference to the first aspect, or the first possible implementation manner of the first aspect, or the second possible implementation manner of the first aspect, in a third possible implementation manner of the first aspect, before the step of determining, by the control manager according to the alarm signal, whether a link corresponding to the alarm signal is abnormal, the method further includes:

if the alarm signal sent by the link determining device is received, increasing, by the control manager, a quantity of link alarm times by one; and determining, by the control manager, whether the quantity of link alarm times that is increased by one is greater than a preset threshold; and the step of determining, by the control manager according to the alarm signal, whether a link corresponding to the alarm signal is abnormal includes:

if the quantity of link alarm times that is increased by one is greater than the preset threshold, determining, by the control manager, that the link is abnormal.

With reference to the third possible implementation manner of the first aspect, in a fourth possible implementation manner of the first aspect, after the step of determining, by the control manager, that the link is abnormal, the method further includes:

updating, by the control manager, link status information in a link status information table from normal to abnormal.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner of the first aspect, before the step of generating, by the control manager, reference optical label information and an enabling signal according to the routing information, the method further includes:

determining, by the control manager, enabling signal activation duration according to the packet length information, where the enabling signal activation duration is used to determine a time at which the enabling signal is deactivated; and after the step of determining, by the control manager when the enabling signal is active, whether an alarm signal sent by the link determining device is received, the method further includes:

performing, by the control manager, a zero assignment operation on the quantity of link alarm times when the enabling signal is inactive and if the alarm signal sent by the link determining device is not received.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner of the first aspect, the link is a link in a primary optical packet switch or a link in a secondary optical packet switch;

the step of determining, by the control manager according to the alarm signal if the alarm signal sent by the link determining device is received, whether a link corresponding to the alarm signal is abnormal includes:

if an alarm signal that corresponds to the link in the primary optical packet switch and that is sent by the link determining device is received, determining, by the control manager according to the alarm signal that corresponds to the link in the primary optical packet switch, whether the link in the primary optical packet switch is abnormal; and after the step of determining whether the link in the primary optical packet switch is abnormal, the method further includes: if it is determined that the link in the primary optical packet switch is abnormal, sending, by the control manager, a primary/secondary selection control signal to an optical packet switch, so that the secondary optical packet switch performs optical packet switching; or if an alarm signal that corresponds to the link in the secondary optical packet switch and that is sent by the link determining device is received, determining, by the control manager according to the alarm signal that corresponds to the link in the secondary optical packet switch, whether the link in the secondary optical packet switch is abnormal.

With reference to the sixth possible implementation manner of the first aspect, in a seventh possible implementation manner of the first aspect, after the step of determining whether the link in the primary optical packet switch is abnormal, the method further includes:

if it is determined that the link in the primary optical packet switch is abnormal, updating, by the control manager, link status information in the link status information table from normal to that the primary optical packet switch is abnormal; or after the step of determining, by the control manager, whether the link in the secondary optical packet switch is abnormal, the method further includes:

if it is determined that the link in the secondary optical packet switch is abnormal, updating, by the control manager, link status information in the link status information table from that the primary optical packet switch is abnormal to that the secondary optical packet switch is abnormal.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, in an eighth possible implementation manner of the first aspect, after the step of generating, by the control manager, reference optical label information and an enabling signal according to the routing information, the method further includes:

generating, by the control manager, a selection control signal according to the routing information, and sending the selection control signal to the link determining device, where the selection control signal carries identification information corresponding to an output port of the optical packet after switching.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, in a ninth possible implementation manner of the first aspect, after the step of parsing out, by a control manager, routing information carried in an optical label of an optical packet before switching, the method further includes:

calculating, by the control manager according to the routing information, a next hop optical label of the optical packet after switching, so that the optical packet after switching is coupled with the next hop optical label, where the next hop optical label is an optical label, on a next hop optical packet switch, corresponding to the optical packet after switching.

According to a second aspect, an embodiment of the present invention provides a link determining apparatus for an optical packet switching system, including:

a parsing unit, configured to parse out routing information carried in an optical label of an optical packet before switching;

a generation unit, configured to generate reference optical label information and an enabling signal according to the routing information parsed out by the parsing unit;

a sending unit, configured to send the reference optical label information and the enabling signal that are generated by the generation unit to a link determining device;

a judging unit, configured to: when the enabling signal sent by the sending unit is active, determine whether an alarm signal sent by the link determining device is received; and a determining unit, configured to: when the judging unit determines that the alarm signal sent by the link determining device is received, determine, according to the alarm signal, whether a link corresponding to the alarm signal is abnormal.

With reference to the second aspect, in a first possible implementation manner of the second aspect, the reference optical label information generated by the generation unit is at least one type of information included in various information types of the routing information; and the various information types of the routing information include source port information, destination port information, packet length information, or priority information.

With reference to the second aspect or the first possible implementation manner of the second aspect, in a second possible implementation manner of the second aspect, the enabling signal generated by the generation unit is used to trigger the link determining device to detect whether a link is abnormal.

With reference to the second aspect, or the first possible implementation manner of the second aspect, or the second possible implementation manner of the second aspect, in a third possible implementation manner of the second aspect, the apparatus further includes an operation unit, where the operation unit is configured to increase a quantity of link alarm times by one when the judging unit determines that the alarm signal sent by the link determining device is received;

the judging unit is further configured to determine whether the quantity of link alarm times that is increased by one by the operation unit is greater than a preset threshold; and the determining unit is further configured to: when the judging unit determines that the quantity of link alarm times that is increased by one is greater than the preset threshold, determine that the link is abnormal.

With reference to the third possible implementation manner of the second aspect, in a fourth possible implementation manner of the second aspect, the apparatus further includes an updating unit, where the updating unit is configured to update link status information in a link status information table from normal to abnormal when the determining unit determines that the link is abnormal.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner of the second aspect, the determining unit is further configured to determine enabling signal activation duration according to the packet length information, where the enabling signal activation duration is used to determine a time at which the enabling signal is deactivated; and the apparatus further includes a value assignment unit, where the value assignment unit is further configured to perform a zero assignment operation on the quantity of link alarm times when the enabling signal is inactive and the judging unit determines that the alarm signal sent by the link determining device is not received.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, in a sixth possible implementation manner of the second aspect, the link determined by the determining unit is a link in a primary optical packet switch or a link in a secondary optical packet switch;

the determining unit is specifically configured to: when the judging unit determines that an alarm signal that corresponds to the link in the primary optical packet switch and that is sent by the link determining device is received, determine, according to the alarm signal that corresponds to the link in the primary optical packet switch, whether the link in the primary optical packet switch is abnormal; and the sending unit is further configured to: when the determining unit determines that the link in the primary optical packet switch is abnormal, send a primary/secondary selection control signal to an optical packet switch; or the determining unit is further specifically configured to: when the judging unit determines that an alarm signal that corresponds to the link in the secondary optical packet switch and that is sent by the link determining device is received, determine, according to the alarm signal that corresponds to the link in the secondary optical packet switch, whether the link in the secondary optical packet switch is abnormal.

With reference to the sixth possible implementation manner of the second aspect, in a seventh possible implementation manner of the second aspect, the updating unit is specifically configured to: when the determining unit determines that the link in the primary optical packet switch is abnormal, update link status information in the link status information table from normal to that the primary optical packet switch is abnormal; or the updating unit is further specifically configured to: when the determining unit determines that the link in the secondary optical packet switch is abnormal, update link status information in the link status information table from that the primary optical packet switch is abnormal to that the secondary optical packet switch is abnormal.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, in an eighth possible implementation manner of the second aspect, the generation unit is further configured to generate a selection control signal according to the routing information, where the selection control signal carries identification information corresponding to an output port of the optical packet after switching; and the sending unit is further configured to send the selection control signal generated by the generation unit to the link determining device.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, in a ninth possible implementation manner of the second aspect, the apparatus further includes a calculation unit, where the calculation unit is configured to calculate, according to the routing information, a next hop optical label, parsed out by the parsing unit, of the optical packet after switching, where the next hop optical label is an optical label, on a next hop optical packet switch, corresponding to the optical packet after switching.

According to a third aspect, an embodiment of the present invention provides a link determining method for an optical packet switching system, including:

receiving, by a link determining device, reference optical label information and an enabling signal that are sent by a control manager;

parsing out, by the link determining device according to an information type of the reference optical label information, actual optical label information carried in an optical label of an optical packet after switching;

when the enabling signal is active, determining, by the link determining device according to the actual optical label information and the reference optical label information, whether an alarm signal is generated; and when it is determined that the alarm signal is generated, sending, by the link determining device, the alarm signal to the control manager.

With reference to the third aspect, in a first possible implementation manner of the third aspect, an information type of the actual optical label information is the same as that of the reference optical label information.

With reference to the first possible implementation manner of the third aspect, in a second possible implementation manner of the third aspect, the information type includes source port information, destination port information, packet length information, or priority information; and the reference optical label information is at least one information type included in the information type.

With reference to the third aspect, or the first possible implementation manner of the third aspect, or the second possible implementation manner of the third aspect, in a third possible implementation manner of the third aspect, before the step of determining, by the link determining device according to the actual optical label information and the reference optical label information, whether an alarm signal is generated, the method further includes:

calculating, by the link determining device, a mismatch degree between the actual optical label information and the reference optical label information; and the step of determining, by the link determining device according to the actual optical label information and the reference optical label information, whether an alarm signal is generated includes:

determining, by the link determining device according to the mismatch degree between the actual optical label information and the reference optical label information, whether the alarm signal is generated.

With reference to the third possible implementation manner of the third aspect, in a fourth possible implementation manner of the third aspect, the step of determining, by the link determining device according to the mismatch degree between the actual optical label information and the reference optical label information, whether the alarm signal is generated includes:

if the mismatch degree between the actual optical label information and the reference optical label information is greater than a preset threshold, determining, by the link determining device, that the alarm signal is generated; or if the mismatch degree between the actual optical label information and the reference optical label information is less than or equal to the preset threshold, determining, by the link determining device, that the alarm signal is not generated.

With reference to the third aspect, or the first possible implementation manner of the third aspect, or the second possible implementation manner of the third aspect, or the third possible implementation manner of the third aspect, or the fourth possible implementation manner of the third aspect, in a fifth possible implementation manner of the third aspect, before the step of parsing out, by the link determining device according to an information type of the reference optical label information, actual optical label information carried in an optical label of an optical packet after switching, the method further includes:

receiving, by the link determining device, a selection control signal sent by the control manager, where the selection control signal carries identification information corresponding to an output port of the optical packet after switching; and selecting, by the link determining device, the output port of the optical packet after switching from multiple output ports according to the identification information corresponding to the output port of the optical packet after switching; and the step of parsing out, by the link determining device according to an information type of the reference optical label information, actual optical label information carried in an optical label of an optical packet after switching includes:

parsing out, by the link determining device according to the reference optical label information and at the output port of the optical packet after switching, the actual optical label information carried in the optical label of the optical packet after switching.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, in a sixth possible implementation manner of the third aspect, the optical packet after switching is an optical packet after switching by a primary optical packet switch or an optical packet after switching by a secondary optical packet switch;

the step of parsing out, by the link determining device according to the reference optical label information, actual optical label information carried in an optical label of an optical packet after switching includes:

parsing out, by the link determining device according to the reference optical label information, actual optical label information carried in an optical label of the optical packet after switching by the primary optical packet switch; and the step of determining, by the link determining device according to the actual optical label information and the reference optical label information, whether an alarm signal is generated includes:

determining, by the link determining device according to the actual optical label information carried in the optical label of the optical packet after switching by the primary optical packet switch and the reference optical label information, whether an alarm signal corresponding to a link in the primary optical packet switch is generated.

With reference to the sixth possible implementation manner of the third aspect, in a seventh possible implementation manner of the third aspect, the step of parsing out, by the link determining device according to the reference optical label information, actual optical label information carried in an optical label of an optical packet after switching includes:

parsing out, by the link determining device according to the reference optical label information, actual optical label information carried in an optical label of the optical packet after switching by the secondary optical packet switch; and the step of determining, by the link determining device according to the actual optical label information and the reference optical label information, whether an alarm signal is generated includes:

determining, by the link determining device according to the actual optical label information carried in the optical label of the optical packet after switching by the secondary optical packet switch and the reference optical label information, whether an alarm signal corresponding to a link in the secondary optical packet switch is generated.

With reference to the seventh possible implementation manner of the third aspect, in an eighth possible implementation manner of the third aspect, after the step of determining, by the link determining device according to the actual optical label information carried in the optical label of the optical packet after switching by the primary optical packet switch and the reference optical label information, whether an alarm signal corresponding to a link in the primary optical packet switch is generated, the method further includes:

when it is determined that the alarm signal corresponding to the link in the primary optical packet switch is generated, sending, by the link determining device, the alarm signal corresponding to the link in the primary optical packet switch to the control manager; or after the step of determining, by the link determining device according to the actual optical label information carried in the optical label of the optical packet after switching by the secondary optical packet switch and the reference optical label information, whether an alarm signal corresponding to a link in the secondary optical packet switch is generated, the method further includes:

when it is determined that the alarm signal corresponding to the link in the secondary optical packet switch is generated, sending, by the link determining device, the alarm signal corresponding to the link in the secondary optical packet switch to the control manager.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, or the sixth possible implementation manner of the third aspect, or the seventh possible implementation manner of the third aspect, or the eighth possible implementation manner of the third aspect, in a ninth possible implementation manner of the third aspect, after the step of parsing out, by the link determining device according to the reference optical label information, actual optical label information carried in an optical label of an optical packet after switching, the method further includes:

when the enabling signal is inactive, if the actual optical label information carried in the optical label of the optical packet after switching cannot be parsed out, determining, by the link determining device, that the alarm signal is generated.

According to a fourth aspect, an embodiment of the present invention provides a link determining apparatus for an optical packet switching system, including:

a receiving unit, configured to receive reference optical label information and an enabling signal that are sent by a control manager;

a parsing unit, configured to parse out, according to an information type of the reference optical label information received by the receiving unit, actual optical label information carried in an optical label of an optical packet after switching;

a determining unit, configured to: when the enabling signal received by the receiving unit is active, determine, according to the actual optical label information parsed out by the parsing unit and the reference optical label information received by the receiving unit, whether an alarm signal is generated; and a sending unit, configured to: when the determining unit determines that the alarm signal is generated, send the alarm signal to the control manager.

With reference to the fourth aspect, in a first possible implementation manner of the fourth aspect, an information type of the actual optical label information parsed out by the parsing unit is the same as that of the reference optical label information received by the receiving unit.

With reference to the first possible implementation manner of the fourth aspect, in a second possible implementation manner of the fourth aspect, the information type includes source port information, destination port information, packet length information, or priority information; and the reference optical label information received by the receiving unit is at least one information type included in the information type.

With reference to the fourth aspect, or the first possible implementation manner of the fourth aspect, or the second possible implementation manner of the fourth aspect, in a third possible implementation manner of the fourth aspect, the apparatus further includes a calculation unit, where the calculation unit is configured to calculate a mismatch degree between the actual optical label information parsed out by the parsing unit and the reference optical label information received by the receiving unit; and the determining unit is specifically configured to determine, according to the mismatch degree, calculated by the calculation unit, between the actual optical label information and the reference optical label information, whether the alarm signal is generated.

With reference to the third possible implementation manner of the fourth aspect, in a fourth possible implementation manner of the fourth aspect, the determining unit is specifically configured to: when the mismatch degree between the actual optical label information and the reference optical label information is greater than a preset threshold, determine that the alarm signal is generated; or the determining unit is further specifically configured to: when the mismatch degree between the actual optical label information and the reference optical label information is less than or equal to the preset threshold, determine that the alarm signal is not generated.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, in a fifth possible implementation manner of the fourth aspect, the receiving unit is further configured to receive a selection control signal sent by the control manager, where the selection control signal carries identification information corresponding to an output port of the optical packet after switching; and the apparatus further includes a selection unit, where the selection unit is configured to select the output port of the optical packet after switching from multiple output ports according to the identification information corresponding to the output port of the optical packet after switching, where the identification information is received by the receiving unit; and the parsing unit is specifically configured to parse out, according to the reference optical label information and at the output port, selected by the selection unit, of the optical packet after switching, the actual optical label information carried in the optical label of the optical packet after switching.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, in a sixth possible implementation manner of the fourth aspect, the optical packet after switching parsed by the parsing unit is an optical packet after switching by a primary optical packet switch or an optical packet after switching by a secondary optical packet switch;

the parsing unit is specifically configured to parse out, according to the reference optical label information, actual optical label information carried in an optical label of the optical packet after switching by the primary optical packet switch; and the determining unit is specifically configured to determine, according to the actual optical label information carried in the optical label of the optical packet after switching by the primary optical packet switch and the reference optical label information, whether an alarm signal corresponding to a link in the primary optical packet switch is generated.

With reference to the sixth possible implementation manner of the fourth aspect, in a seventh possible implementation manner of the fourth aspect, the parsing unit is further specifically configured to parse out, according to the reference optical label information, actual optical label information carried in an optical label of the optical packet after switching by the secondary optical packet switch; and the determining unit is further specifically configured to determine, according to the actual optical label information carried in the optical label of the optical packet after switching by the secondary optical packet switch and the reference optical label information, whether an alarm signal corresponding to a link in the secondary optical packet switch is generated.

With reference to the seventh possible implementation manner of the fourth aspect, in an eighth possible implementation manner of the fourth aspect, the sending unit is further configured to: when the determining unit determines that the alarm signal corresponding to the link in the primary optical packet switch is generated, send the alarm signal corresponding to the link in the primary optical packet switch to the control manager; or the sending unit is further configured to: when the determining unit determines that the alarm signal corresponding to the link in the secondary optical packet switch is generated, send the alarm signal corresponding to the link in the secondary optical packet switch to the control manager.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, or the sixth possible implementation manner of the fourth aspect, or the seventh possible implementation manner of the fourth aspect, or the eighth possible implementation manner of the fourth aspect, in a ninth possible implementation manner of the fourth aspect, the determining unit is further configured to: when the enabling signal received by the receiving unit is inactive, if the actual optical label information carried in the optical label of the optical packet after switching cannot be parsed out, determine that the alarm signal is generated.

According to a fifth aspect, an embodiment of the present invention provides a link determining system for an optical packet switching system, including a control manager and a link determining device, where the control manager is configured to parse out routing information carried in an optical label of an optical packet before switching, and generate reference optical label information and an enabling signal according to the routing information;

the control manager is further configured to send the reference optical label information and the enabling signal to the link determining device;

the link determining device is configured to receive the reference optical label information and the enabling signal that are sent by the control manager, and parse out, according to an information type of the reference optical label information, actual optical label information carried in an optical label of the optical packet after switching;

the link determining device is further configured to: when the enabling signal is active, determine, according to the actual optical label information and the reference optical label information, whether an alarm signal is generated, and when it is determined that the alarm signal is generated, send the alarm signal to the control manager; and the control manager is further configured to: when the enabling signal is active, determine whether the alarm signal sent by the link determining device is received, and if the alarm signal sent by the link determining device is received, determine, according to the alarm signal, whether a link corresponding to the alarm signal is abnormal.

According to the link determining method, apparatus, and system for an optical packet switching system provided in the embodiments of the present invention, first, a control manager generates reference optical label information and an enabling signal, and sends the reference optical label information and the enabling signal to a link determining device; then, when the enabling signal is active, the link determining device determines, according to parsed-out actual optical label information and the received reference optical label information, whether an alarm signal is generated, and if it is determined that the alarm signal is generated, sends the alarm signal to the control manager; and finally, the control manager further determines, according to the received alarm signal, whether a link corresponding to the alarm signal is abnormal. In the prior art, a test signal before switching by an optical packet switch is coupled at a circulator at each output port of the optical packet switch, and the test signal after switching by the optical packet switch is obtained at a circulator at each input port of the optical packet switch. In comparison, in the embodiments of the present invention, an optical label before switching by an optical packet switch and the optical label after switching by the optical packet switch are obtained, which can avoid that a test signal is coupled by using a circulator at each output port of the optical packet switch, and also avoid that the test signal is separated at a circulator at each input port of the optical packet switch, thereby reducing optical packet switching costs.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Figure 1:
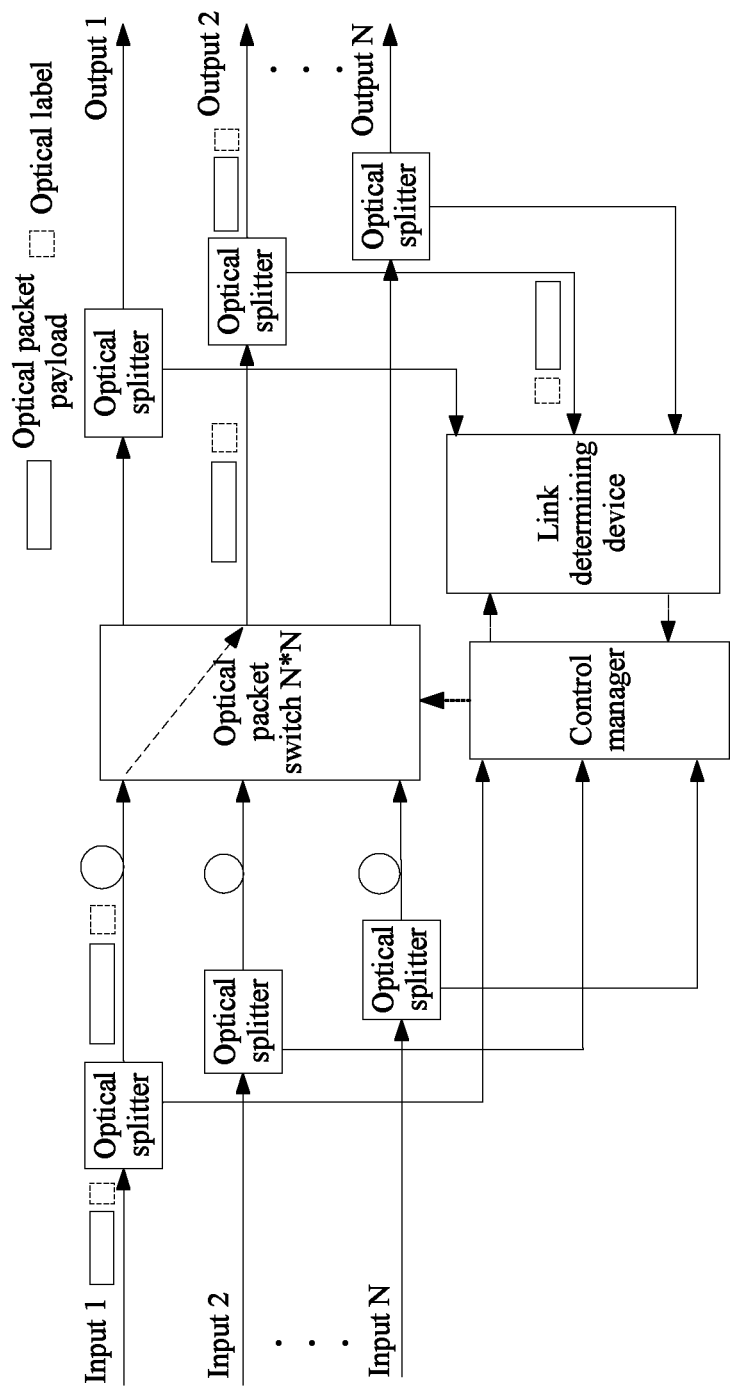
FIG. 1 is an architecture diagram of a link determining system for an optical packet switching system according to an embodiment of the present invention.

A technical solution provided in an embodiment of the present invention may be applied to an architecture diagram of a link determining system for an optical packet switching system, as shown in FIG. 1. An architecture of the link determining system for an optical packet switching system includes an optical packet switch, a control manager, and a link determining device. When an optical packet enters the optical packet switching system from a specific input port, first, optical energy of an optical packet before switching is split to allow a large portion of the optical energy to enter an optical switch through an optical fiber delay line and allow a small portion of the optical energy to enter a control manager; then, optical energy of the optical packet after switching is split at a corresponding output port to allow a large portion of the optical energy to be outputted and allow a small portion of the optical energy to enter a link determining device, so that the control manager determines, according to a determining result of the link determining device, whether a link corresponding to the optical packet is abnormal.

Embodiment 1

Figure 2:
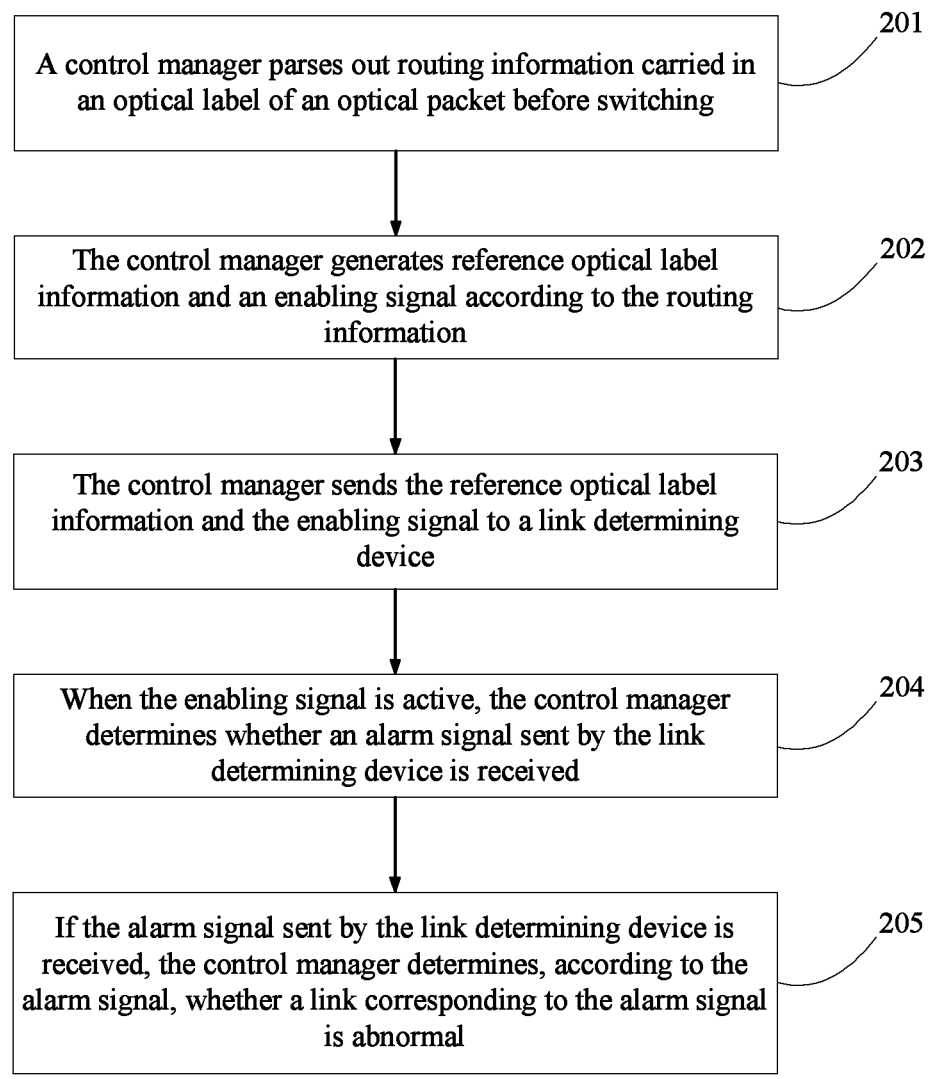
FIG. 2 is a flowchart of a link determining method for an optical packet switching system according to Embodiment 1 of the present invention.

This embodiment of the present invention provides a link determining method for an optical packet switching system, as shown in FIG. 2. The method includes:

201: A control manager parses out routing information carried in an optical label of an optical packet before switching.

Various information types of the routing information may include source port information, destination port information, packet length information, priority information, and the like. In this embodiment of the present invention, an optical packet includes an optical packet payload and an optical label. The optical label carries routing information such as source port information, destination port information, packet length information, and priority information.

In this embodiment of the present invention, the control manager may generate, by parsing out the routing information carried in the optical label of the optical packet before switching, a control signal required when a corresponding optical path is set up in an optical packet switch, reference optical label information required when a link determining device detects whether a link is abnormal, and an enabling signal required when the control manager detects whether the link is abnormal.

202: The control manager generates reference optical label information and an enabling signal according to the routing information;

The reference optical label information may be at least one type of information included in various information types of the routing information. For example, the reference optical label information may be the source port information, or the reference optical label information may be the packet length information, or the reference optical label information may be the destination port information and the priority information, or the reference optical label information may be the source port information, the destination port information, the packet length information, and the priority information.

In this embodiment of the present invention, the reference optical label information is used as a reference for the link determining device to detect whether a link is abnormal. Specifically, the link determining device first calculates, according to the reference optical label information generated by the control manager before optical packet switching and parsed-out optical label information in the optical label after switching by an optical packet switch, a mismatch degree between the reference optical label information and the actual optical label information, then determines whether the mismatch degree between the reference optical label information and the actual optical label information is greater than or equal to a preset threshold, and finally determines, according to a determining result, whether an alarm signal corresponding to the link is generated.

Optionally, the reference optical label information may include many types of information. In this embodiment of the present invention, because the reference optical label information is used as reference information for determining whether the link is abnormal, more information items included in the reference optical label information indicate higher accuracy of determining, by the link determining device, whether the alarm signal corresponding to the link is generated.

Alternatively, the reference optical label information may include a few types of information. In this embodiment of the present invention, because the reference optical label information is used as reference information for determining whether the link is abnormal, less information items included in the reference optical label information indicate lower complexity of determining, by the link determining device, whether the alarm signal corresponding to the link is generated.

In this embodiment of the present invention, the enabling signal is used to trigger the link determining device to detect whether a link is abnormal. Specifically, only when an enabling signal corresponding to a link from an input port m to an output port i is active, the link determining device can determine, according to the mismatch degree between the reference optical label information generated by the control manager before optical packet switching and the parsed-out optical label information in the optical label after switching by the optical packet switch, whether an alarm signal corresponding to the link is generated, and the control manager can determine whether the link is abnormal. m is an integer greater than or equal to 1 and less than or equal to N, i is an integer greater than or equal to 1 and less than or equal to M, N is a quantity of input ports of the optical packet switch, M is a quantity of output ports of the optical packet switch, N and M are both integers greater than or equal to 1, and generally, M may be equal to N.

203: The control manager sends the reference optical label information and the enabling signal to a link determining device.

In this embodiment of the present invention, the control manager sends the reference optical label information and the enabling signal to the link determining device, so that when the enabling signal is active, the link determining device may determine, according to the reference optical label information and information extracted from the optical label of the optical packet after switching by the optical packet switch, whether the alarm information is generated.

In this embodiment of the present invention, as shown in FIG. 1, an optical packet inputted from each input port may first pass through an optical splitter, so that the optical splitter splits the optical packet into two parts. One part includes a large portion of optical energy, and the other part includes a small portion of the optical energy. The large portion of the optical energy enters the optical packet switch, and the small portion of the optical energy enters the control manager. For example, the optical splitter may distribute 90% of the optical energy of the optical packet to the optical packet switch, and distribute the remaining 10% of the optical energy to the control manager; or the optical splitter may distribute 85% of the optical energy of the optical packet to the optical packet switch, and distribute the remaining 15% of the optical energy to the control manager.

In this embodiment of the present invention, before the optical packet enters the optical packet switch, the optical splitter splits the optical packet into two parts, and a large portion of the optical energy enters the optical packet switch, and the remaining small portion of the optical energy enters the control manager, which can implement that the control manager extracts routing information according to the small portion of the optical energy, generates a control signal, reference optical label information, and an enabling signal, and then controls the optical packet switch to perform optical packet switching for the large portion of the optical energy.

Optionally, after the optical packet is split into two parts by the optical splitter, the large portion of the optical energy may first pass through an optical fiber delay line with a specific length, and then enter the optical packet switch. In this embodiment of the present invention, the large portion of the optical energy enters the optical packet switch after passing through the optical fiber delay line with a specific length, and therefore sufficient time can be reserved for the control manager to generate the corresponding control signal. Then, before the large portion of the optical energy enters the optical packet switch, the optical packet switch may control, according to the control signal, a corresponding optical packet switching link to be generated.

204: When the enabling signal is active, the control manager determines whether an alarm signal sent by the link determining device is received.

Optionally, step 204 may also be: within preset duration from a time at which the enabling signal is activated to a time at which the enabling signal is deactivated, the control manager determines whether the alarm signal sent by the link determining device is received.

In this embodiment of the present invention, corresponding enabling signal activation duration in the control manager is the same as that in the link determining device, and a delay exists when the link determining device sends the alarm signal to the control manager. Therefore, a case exists in which the link determining device sends the alarm signal to the control manager within the enabling signal activation duration but the control manager receives the alarm signal after the enabling signal is deactivated. In this embodiment of the present invention, the control manager determines, within the preset duration from the time at which the enabling signal is activated to the time at which the enabling signal is deactivated, whether the alarm signal sent by the link determining device is received, which can avoid a case, in which the control manager obtains a false determining result about whether the alarm signal is received, caused by that the link determining device sends the alarm signal to the control manager within the enabling signal activation duration but the control manager receives the alarm signal after the enabling signal is deactivated. Therefore, accuracy of determining, by the control manager, whether the link is abnormal can be improved.

The preset duration may be configured in advance by the control manager, which is not limited in this embodiment of the present invention. For example, the preset duration may be two milliseconds, three milliseconds, or five milliseconds.

205: If the alarm signal sent by the link determining device is received, the control manager determines, according to the alarm signal, whether a link corresponding to the alarm signal is abnormal.

Specifically, if the alarm signal sent by the link determining device is received, the control manager may first increase a quantity of link alarm times by one, and then determine whether the quantity of link alarm times that is increased by one is greater than a preset threshold; and if the quantity of link alarm times that is increased by one is greater than the preset threshold, the control manager determines that the link is abnormal.

The preset threshold may be configured in advance by the control manager, or may be configured in advance by the optical packet switch, which is not limited in this embodiment of the present invention. In this embodiment of the present invention, the preset threshold may be an integer greater than 1. For example, the preset threshold may be 3, 5, or 10.

Figure 3:
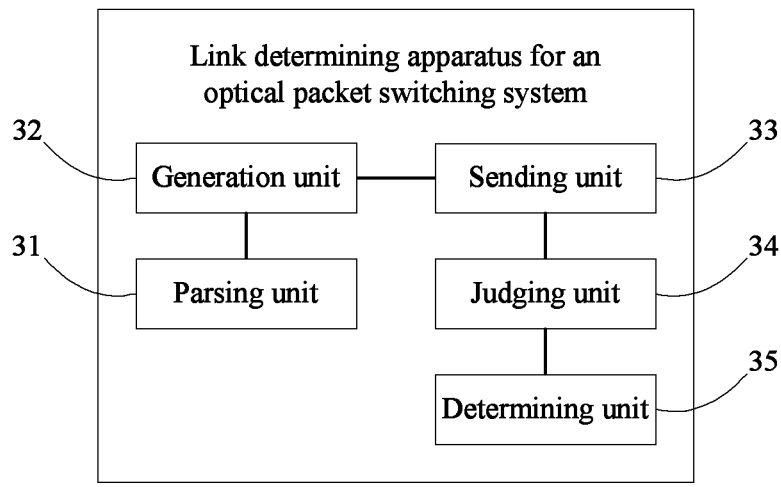
FIG. 3 is a schematic structural diagram of a link determining apparatus for an optical packet switching system according to Embodiment 1 of the present invention.

In this embodiment of the present invention, whether the link corresponding to the alarm signal is abnormal is determined by determining whether the quantity of alarm times of the link corresponding to the alarm signal is greater than the preset threshold, which can avoid a case in which a false alarm is caused by a deteriorated signal after switching because of a transient jitter of a component, such as an optical switch, in the optical packet switch. Therefore, accuracy of determining, by the control manager, whether the link is abnormal can be improved. Further, as specific implementation of the method shown in FIG. 2, this embodiment of the present invention provides a link determining apparatus for an optical packet switching system, as shown in FIG. 3. An entity of the apparatus may be a control manager, and the apparatus includes a parsing unit 31, a generation unit 32, a sending unit 33, a judging unit 34, and a determining unit 35.

The parsing unit 31 is configured to parse out routing information carried in an optical label of an optical packet before switching.

The generation unit 32 is configured to generate reference optical label information and an enabling signal according to the routing information parsed out by the parsing unit 31.

The sending unit 33 is configured to send the reference optical label information and the enabling signal that are generated by the generation unit 32 to a link determining device.

The judging unit 34 is configured to: when the enabling signal sent by the sending unit 33 is active, determine whether an alarm signal sent by the link determining device is received.

The determining unit 35 is configured to: when the judging unit 34 determines that the alarm signal sent by the link determining device is received, determine, according to the alarm signal, whether a link corresponding to the alarm signal is abnormal.

It should be noted that, for other corresponding descriptions corresponding to each functional unit in the link determining apparatus for an optical packet switching system provided in this embodiment of the present invention, reference may be made to the corresponding descriptions in FIG. 1, which are not described herein.

Figure 4:
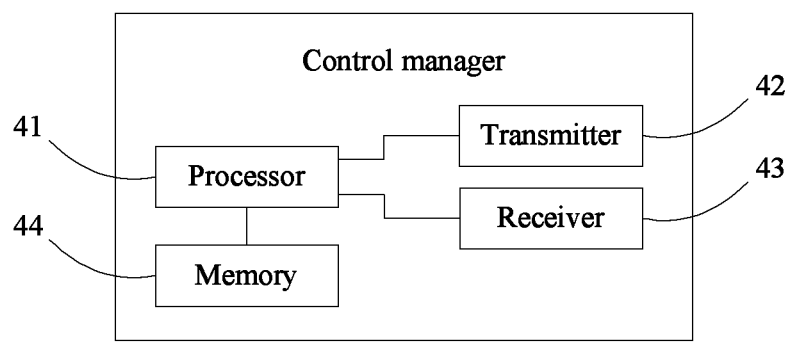
FIG. 4 is a schematic structural diagram of a control manager according to Embodiment 1 of the present invention.

Still further, an entity of the link determining apparatus for an optical packet switching system may be a control manager, as shown in FIG. 4. The control manager may include a processor 41, a transmitter 42, a receiver 43, and a memory 44, where the receiver 43 and the memory 44 are both connected to the processor 41.

The processor 41 is configured to parse out routing information carried in an optical label of an optical packet before switching.

The processor 41 is further configured to generate reference optical label information and an enabling signal according to the routing information.

The transmitter 42 is configured to send the reference optical label information and the enabling signal that are generated by the processor 41 to a link determining device.

The processor 41 is further configured to: when the enabling signal sent by the transmitter 42 is active, determine whether an alarm signal sent by the link determining device is received.

The processor 41 is further configured to: when it is determined that the alarm signal sent by the link determining device is received, determine, according to the alarm signal, whether a link corresponding to the alarm signal is abnormal.

It should be noted that, for other corresponding descriptions corresponding to each device in the control manager provided in this embodiment of the present invention, reference may be made to the corresponding descriptions in FIG. 2, which are not described herein.

According to the link determining method, apparatus, and system for an optical packet switching system provided in the embodiments of the present invention, first, a control manager generates reference optical label information and an enabling signal, and sends the reference optical label information and the enabling signal to a link determining device; then, when the enabling signal is active, the link determining device determines, according to parsed-out actual optical label information and the received reference optical label information, whether an alarm signal is generated, and if it is determined that the alarm signal is generated, sends the alarm signal to the control manager; and finally, the control manager further determines, according to the received alarm signal, whether a link corresponding to the alarm signal is abnormal. In the prior art, a test signal before switching by an optical packet switch is coupled at a circulator at each output port of the optical packet switch, and the test signal after switching by the optical packet switch is obtained at a circulator at each input port of the optical packet switch. In comparison, in the embodiments of the present invention, an optical label before switching by an optical packet switch and the optical label after switching by the optical packet switch are obtained, which can avoid that a test signal is coupled by using a circulator at each output port of the optical packet switch, and also avoid that the test signal is separated at a circulator at each input port of the optical packet switch, thereby reducing optical packet switching costs.

Embodiment 2

Figure 5:
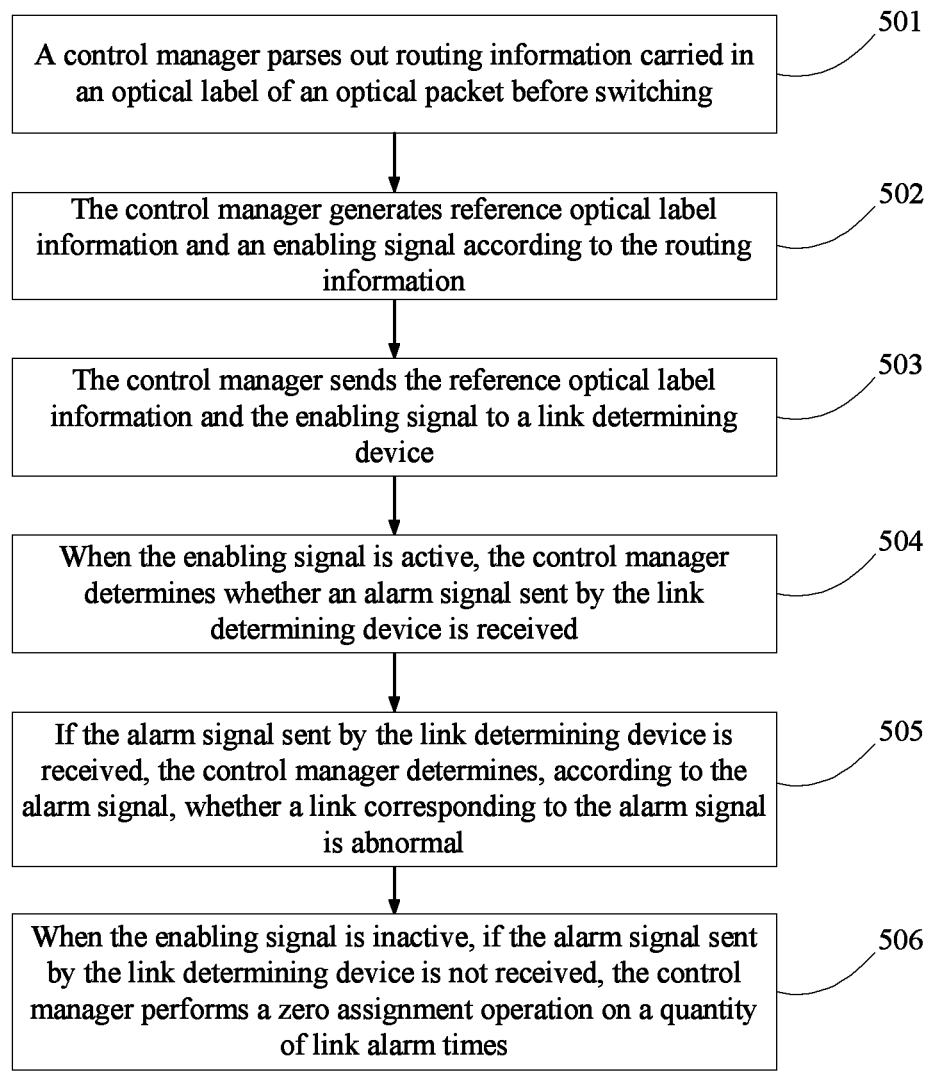
FIG. 5 is a flowchart of a link determining method for an optical packet switching system according to Embodiment 2 of the present invention.

This embodiment of the present invention provides a link determining method for an optical packet switching system, as shown in FIG. 5. The method includes:

501: A control manager parses out routing information carried in an optical label of an optical packet before switching.

Various information types of the routing information may include source port information, destination port information, packet length information, priority information, or the like. In this embodiment of the present invention, an optical packet includes an optical packet payload and an optical label. The optical label carries routing information such as source port information, destination port information, packet length information, and priority information.

In this embodiment of the present invention, the control manager may generate, by parsing out the routing information carried in the optical label of the optical packet before switching, a control signal required when a corresponding optical path is set up in an optical packet switch, reference optical label information required when a link determining device determines whether a link is abnormal, and an enabling signal required when the control manager determines whether the link is abnormal.

Figure 6:
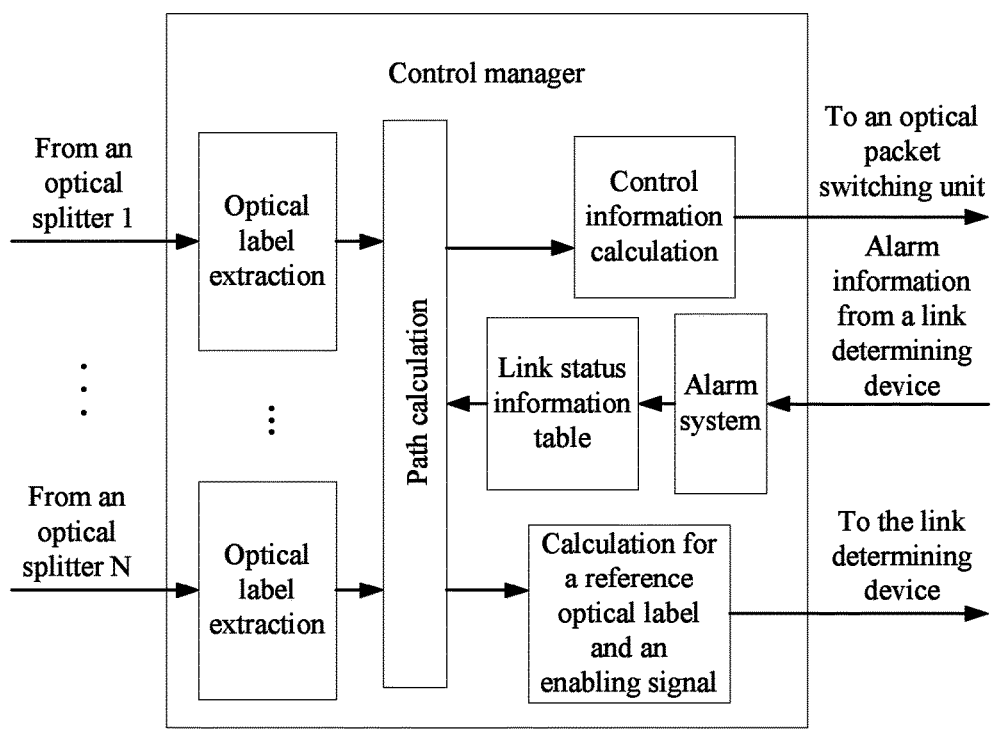
FIG. 6 is a schematic structural diagram of a control manager according to Embodiment 2 of the present invention.

In this embodiment of the present invention, the control manager may include N optical label extraction modules, a link calculation module, a control information calculation module, a module for calculating a reference optical label and an enabling signal, an alarm system, a link status information table, and the like, as shown in FIG. 6. The optical label extraction module is configured to parse out routing information of an optical label in an optical packet at an input port, and different input ports of an optical packet switch may correspond to different optical label extraction modules. The link calculation module is configured to determine, according to the routing information parsed out by the optical label extraction module and the link status information table, an output port to which the optical packet is to be switched, a mapping between an optical packet input port and an optical packet output port, and link holding time required in implementing entire switching of the optical packet. The control information calculation module is configured to generate a control signal according to the mapping between an optical packet input port and an optical packet output port, and sends the control signal to the optical packet switch. The module for calculating a reference optical label and an enabling signal is configured to generate corresponding reference optical label information and a corresponding enabling signal according to the mapping between an optical packet input port and an optical packet output port. The alarm system is configured to determine, according to an alarm signal that corresponds to a link and that is sent by a link determining device, whether the link is abnormal, and if it is determined that the link is abnormal, feeds back link abnormal information to the link status information table, so that link status information is updated in the link status information table. The link status information table is used to store information about whether a link between each input port and each output port is abnormal.

502: The control manager generates reference optical label information and an enabling signal according to the routing information.

The reference optical label information may be at least one type of information included in various information types of the routing information. For example, the reference optical label information may be the source port information, or the reference optical label information may be the packet length information, or the reference optical label information may be the destination port information and the priority information, or the reference optical label information may be the source port information, the destination port information, the packet length information, and the priority information.

In this embodiment of the present invention, the reference optical label information is used as a reference for the link determining device to detect whether a link is abnormal. Specifically, the link determining device first calculates, according to the reference optical label information generated by the control manager before optical packet switching and parsed-out optical label information in the optical label after switching by the optical packet switch, a mismatch degree between the reference optical label information and the actual optical label information, then determines whether the mismatch degree between the reference optical label information and the actual optical label information is greater than or equal to a preset threshold, and finally determines, according to a determining result, whether an alarm signal corresponding to the link is generated.

Optionally, the reference optical label information may include many types of information. In this embodiment of the present invention, because the reference optical label information is used as reference information for determining whether the link is abnormal, more information items included in the reference optical label information indicate higher accuracy of determining, by the link determining device, whether the alarm signal corresponding to the link is generated.

Alternatively, the reference optical label information may include a few types of information. In this embodiment of the present invention, because the reference optical label information is used as reference information for determining whether the link is abnormal, less information items included in the reference optical label information indicate lower complexity of determining, by the link determining device, whether the alarm signal corresponding to the link is generated.

In this embodiment of the present invention, the enabling signal is used to trigger the link determining device to detect whether a link is abnormal. Specifically, only when an enabling signal corresponding to a link from an input port m to an output port i is active, the link determining device can determine, according to the mismatch degree between the reference optical label information generated by the control manager before optical packet switching and the parsed-out optical label information in the optical label after switching by the optical packet switch, whether an alarm signal corresponding to the link is generated, and the control manager can determine whether the link is abnormal. m is an integer greater than or equal to 1 and less than or equal to N, i is an integer greater than or equal to 1 and less than or equal to M, N is a quantity of input ports of the optical packet switch, M is a quantity of output ports of the optical packet switch, N and M are both integers greater than or equal to 1, and generally, M may be equal to N.

Figure 7:
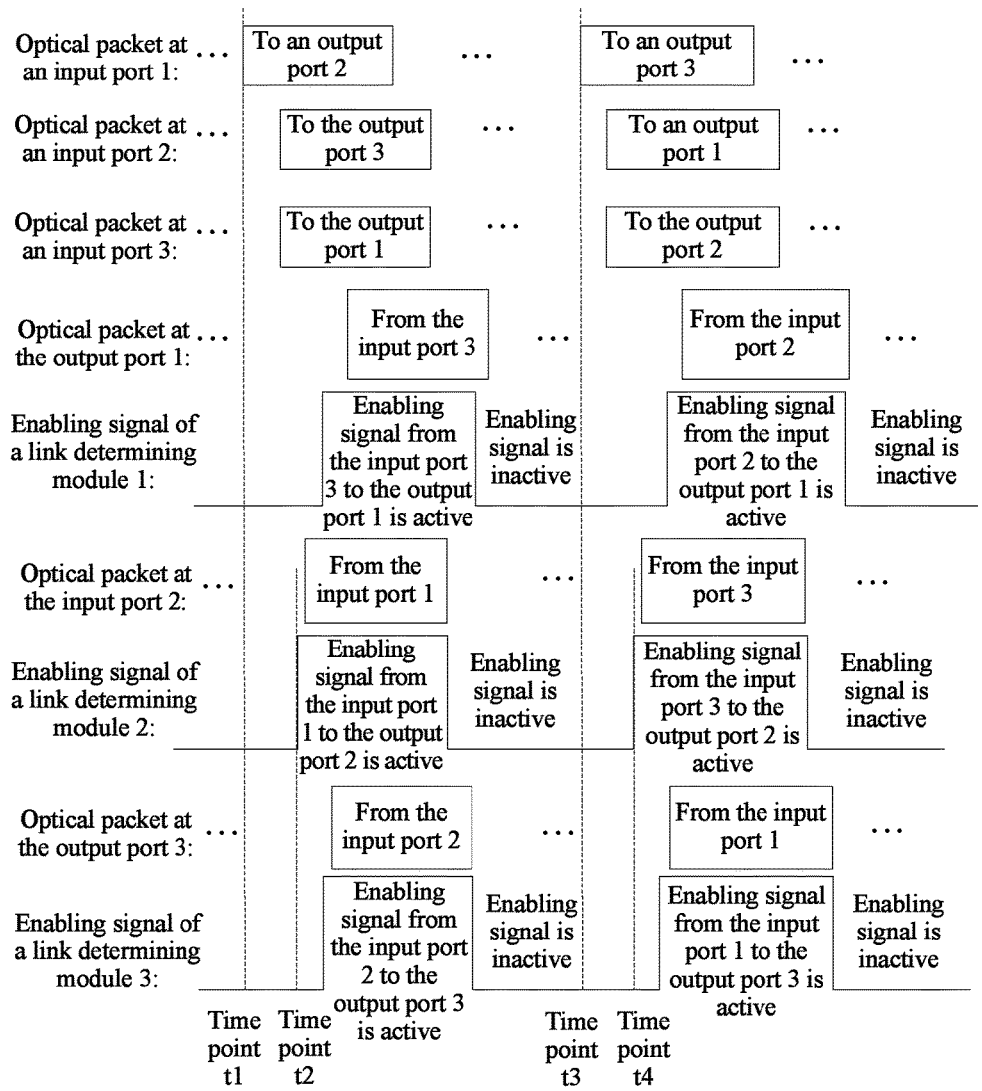
FIG. 7 is a schematic diagram of an enabling signal according to Embodiment 2 of the present invention.

For example, FIG. 7 is a schematic diagram of an enabling signal of an optical packet switching apparatus that includes three input ports and three output ports. In the figure, at a time point t1, an input port 1 receives an optical packet that needs to be switched to an output port 2. After a small portion of optical energy of the optical packet passes through the control manager, the control manager may determine an output port to which the optical packet needs to be switched. If link status information in the link status information table is normal, optical packet switching may be performed on the optical packet by using the link. In addition, the control manager may obtain, by means of calculation, that the optical packet starts to be outputted from the output port 2 at a time point t2. Therefore, the control manager activates the enabling signal of the link at the time point t2, and the control manager deactivates the enabling signal of the link till the entire optical packet is outputted from the output port 2.

For another example, in FIG. 7, at a time point t3, the input port 1 receives an optical packet that needs to be switched to an output port 3. After a small portion of optical energy of the optical packet passes through the control manager, the control manager may determine an output port to which the optical packet needs to be switched. If link status information in the link status information table is normal, optical packet switching may be performed on the optical packet by using the link. In addition, the control manager may obtain, by means of calculation, that the optical packet starts to be outputted from the output port 3 at a time point t4. Therefore, the control manager activates the enabling signal of the link at the time point t4, and the control manager deactivates the enabling signal of the link till the entire optical packet is outputted from the output port 3.

Optionally, before step 502, the method may further include: the control manager determines enabling signal activation duration according to packet length information. The enabling signal activation duration may be used to determine a time at which the enabling signal is deactivated. In this embodiment of the present invention, the time at which the enabling signal is deactivated may be a sum of a time at which the enabling signal is activated and the enabling signal activation duration.

In this embodiment of the present invention, the control manager determines the enabling signal activation duration according to the packet length information, and further determines, after the enabling signal is activated, the time at which the enabling signal is deactivated, which can implement that the control manager deactivates the enabling signal only after the optical packet is outputted from a corresponding output port, that is, the control manager may control enabling signal duration to be long enough.

In this embodiment of the present invention, after step 502, the method may further include: the control manager generates a selection control signal according to the routing information, and sends the selection control signal to the link determining device. The selection control signal may carry identification information corresponding to an output port of the optical packet after switching.

Figure 8:
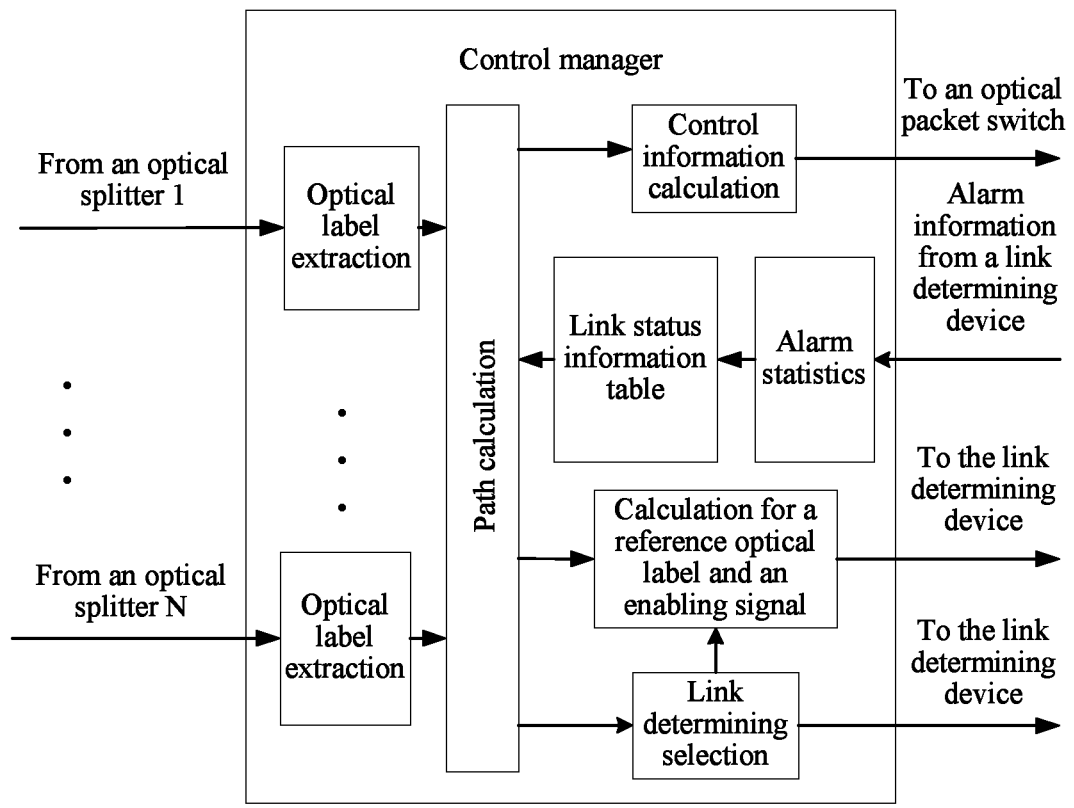
FIG. 8 is a schematic structural diagram of another control manager according to Embodiment 2 of the present invention.

In this embodiment of the present invention, a K*1 optical switch may be added to the link determining device, so that a quantity of link determining modules in the link determining device is reduced, thereby simplifying an optical packet switching system and facilitating integration of the optical packet switching system. In this embodiment of the present invention, the selection control signal generated by the control manager may control the K*1 optical switch, so as to implement that the K*1 optical switch may select any output port from K different output ports, and send, to a specific link determining module in the link determining device, an optical packet outputted from the output port, to detect whether a link is abnormal. In this case, a link determining selection module may be added to the control manager, as shown in FIG. 8. The link determining selection module is configured to generate a selection control signal.

503: The control manager sends the reference optical label information and the enabling signal to a link determining device.

In this embodiment of the present invention, the control manager sends the reference optical label information and the enabling signal to the link determining device, so that when the enabling signal is active, the link determining device may determine, according to the reference optical label information and information extracted from the optical label of the optical packet after switching by the optical packet switch, whether the alarm information is generated.

504: When the enabling signal is active, the control manager determines whether an alarm signal sent by the link determining device is received.

Optionally, step 504 may also be: within preset duration from a time at which the enabling signal is activated to a time at which the enabling signal is deactivated, the control manager determines whether the alarm signal sent by the link determining device is received.

In this embodiment of the present invention, corresponding enabling signal activation duration in the control manager is the same as that in the link determining device, and a delay exists when the link determining device sends the alarm signal to the control manager. Therefore, a case exists in which the link determining device sends the alarm signal to the control manager within the enabling signal activation duration but the control manager receives the alarm signal after the enabling signal is deactivated. In this embodiment of the present invention, the control manager determines, within the preset duration from the time at which the enabling signal is activated to the time at which the enabling signal is deactivated, whether the alarm signal sent by the link determining device is received, which can avoid a case, in which the control manager obtains a false determining result about whether the alarm signal is received, caused by that the link determining device sends the alarm signal to the control manager within the enabling signal activation duration but the control manager receives the alarm signal after the enabling signal is deactivated. Therefore, accuracy of determining, by the control manager, whether the link is abnormal can be improved.

The preset duration may be configured in advance by the control manager, which is not limited in this embodiment of the present invention. For example, the preset duration may be two milliseconds, three milliseconds, or five milliseconds.

505: If the alarm signal sent by the link determining device is received, the control manager determines, according to the alarm signal, whether a link corresponding to the alarm signal is abnormal.

Optionally, before step 505, the method may further include: if the alarm signal sent by the link determining device is received, the control manager first increases a quantity of link alarm times by one, and then determines whether the quantity of link alarm times that is increased by one is greater than a preset threshold. In this case, step 505 may be: if the quantity of link alarm times that is increased by one is greater than the preset threshold, the control manager determines that the link is abnormal.

The preset threshold may be configured in advance by the control manager, or may be configured in advance by the optical packet switch, which is not limited in this embodiment of the present invention. In this embodiment of the present invention, the preset threshold may be an integer greater than 1. For example, the preset threshold may be 3, 5, or 10.

In this embodiment of the present invention, whether the link corresponding to the alarm signal is abnormal is determined by determining whether the quantity of alarm times of the link corresponding to the alarm signal is greater than the preset threshold, which can avoid a case in which a false alarm is caused by a deteriorated signal after switching because of a transient jitter of a component, such as an optical switch, in the optical packet switch. Therefore, accuracy of determining, by the control manager, whether the link is abnormal can be improved.

Optionally, after step 505, the method may further include: the control manager updates link status information in the link status information table from normal to abnormal.

In this embodiment of the present invention, when determining that the link corresponding to the alarm signal is abnormal, the control manager updates the link status information in the link status information table, so that an abnormality of the link can be reflected in real time in the link status information table, thereby implementing that the control manager may generate a corresponding control signal according to the link status information table.

For example, the control manager may update the link status information in the link status information table from 0 to 1. The link status information 0 in the link status information table indicates that the link is normal, and the link status information 1 indicates that the link is abnormal. Specifically, the link status information table before an update may be shown as the following table:

|  | Output Port 1 | Output Port 2 | . . . | Output Port M |
| --- | --- | --- | --- | --- |
| Input Port 1 | 0 | 0 | 0 | 0 |
| Input Port 2 | 0 | 0 | 0 | 0 |
| . | . | . | . | . |
| . | . | . | . | . |
| . | . | . | . | . |
| Input Port N | 0 | 0 | 0 | 0 |

In this embodiment of the present invention, when the control manager determines that a link for switching from the input port 1 to the output port 2 is abnormal, the control manager updates status information corresponding to the link for switching from the input port 1 to the output port 2 in the link status information table from 0 to 1, and the link status information table after the update may be shown as the following table:

|  | Output Port 1 | Output Port 2 | . . . | Output Port M |
| --- | --- | --- | --- | --- |
| Input Port 1 | 0 | 1 | 0 | 0 |
| Input Port 2 | 0 | 0 | 0 | 0 |
| . | . | . | . | . |
| . | . | . | . | . |
| . | . | . | . | . |
| Input Port N | 0 | 0 | 0 | 0 |

Figure 9:
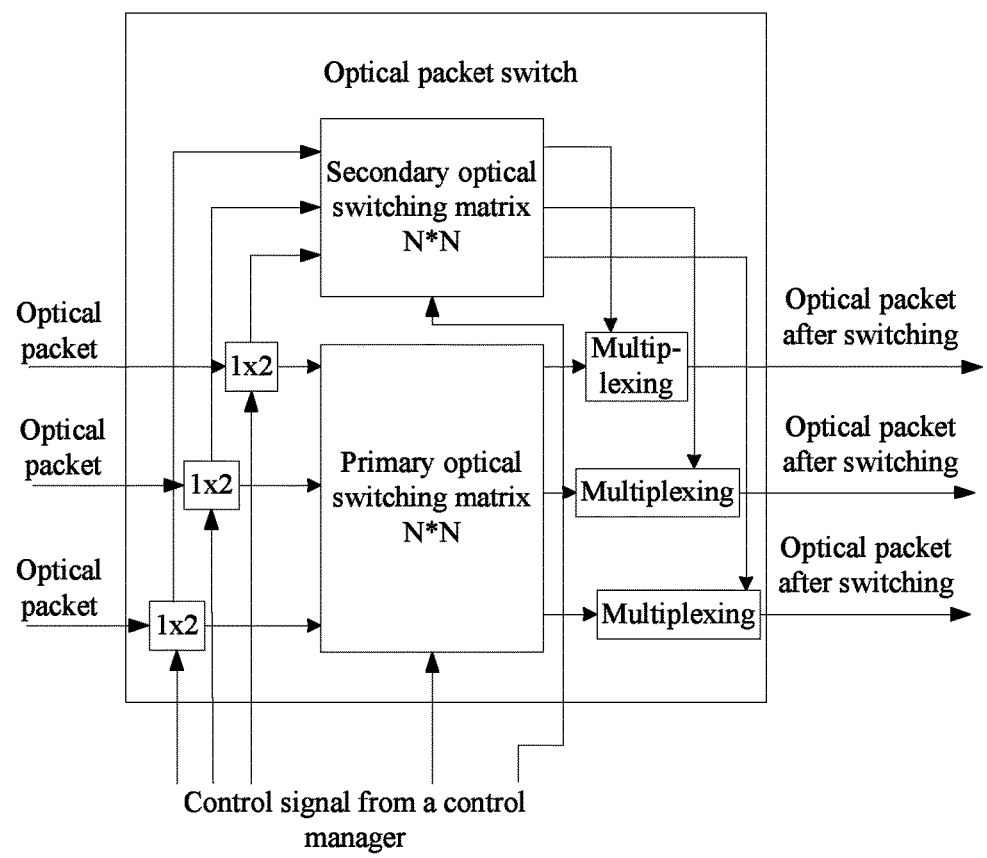
FIG. 9 is a schematic structural diagram of an optical packet switch according to Embodiment 2 of the present invention.

In this embodiment of the present invention, the link may be a link in a primary optical packet switch or a link in a secondary optical packet switch. Specifically, the optical packet switch may be an optical packet switch with primary/secondary protection, as shown in FIG. 9. The optical packet switch with primary/secondary protection may include a primary optical switching matrix, a secondary optical switching matrix, N 1*2 optical switches, and N optical multiplexers.

Optionally, step 505 may also be: if an alarm signal that corresponds to the link in the primary optical packet switch and that is sent by the link determining device is received, the control manager determines, according to the alarm signal that corresponds to the link in the primary optical packet switch, whether the link in the primary optical packet switch is abnormal; and if it is determined that the link in the primary optical packet switch is abnormal, the control manager determines whether the link in the secondary optical packet switch is abnormal. In this case, after step 505, the method may further include: if it is determined that the link in the primary optical packet switch is abnormal, the control manager sends a primary/secondary selection control signal to the secondary optical packet switch.

The primary/secondary selection control signal is used to trigger a 1*2 optical switch in the optical packet switch to switch from the primary optical packet switch to the secondary optical packet switch, so that optical packet switching may be performed on the optical packet by using the secondary optical packet switch. In this embodiment of the present invention, when determining that the link in the primary optical packet switch is abnormal, the control manager sends the primary/secondary selection control signal to the secondary optical packet switch, so that optical packet switching is performed on the optical packet by using the secondary optical packet switch.

Optionally, step 505 may also be: if an alarm signal that corresponds to the link in the secondary optical packet switch and that is sent by the link determining device is received, the control manager determines, according to the alarm signal that corresponds to the link in the secondary optical packet switch, whether the link in the secondary optical packet switch is abnormal.

In this embodiment of the present invention, that the control manager determines whether the link in the secondary optical packet switch is abnormal may be specifically: if the alarm signal that corresponds to the link in the secondary optical packet switch and that is sent by the link determining device is received, the control manager determines, according to the alarm signal that corresponds to the link in the secondary optical packet switch, whether the link in the secondary optical packet switch is abnormal.

In this embodiment of the present invention, preferably, the primary optical packet switch may be used to perform optical packet switching. Only when a specific link in the primary optical packet switch is abnormal, the 1*2 optical switch is used to control a corresponding link in the secondary optical packet switch to perform optical packet switching. In this embodiment of the present invention, the optical packet switch with primary/secondary protection can be used to implement that when a specific link in the primary optical packet switch is abnormal, optical packet switching is performed by using a corresponding link in the secondary optical packet switch, which can avoid as far as possible a case in which optical packet switching cannot be performed in an optical packet switching process due to the abnormal link.

In this embodiment of the present invention, after step 505, the method may further include: if it is determined that the link in the primary optical packet switch is abnormal, the control manager updates link status information in the link status information table from normal to that the primary optical packet switch is abnormal; if it is determined that the link in the secondary optical packet switch is abnormal, the control manager updates link status information in the link status information table from that the primary optical packet switch is abnormal to that the secondary optical packet switch is abnormal.

In this embodiment of the present invention, when determining that the link in the primary optical packet switch is abnormal, the control manager updates the link status information in the link status information table, so that an abnormality of the link can be reflected in real time in the link status information table, thereby implementing that a link manager may generate a corresponding control signal according to the link status information table. In addition, when determining that the link in the secondary optical packet switch is abnormal, the control manager updates the link status information in the link status information table, so that an abnormality of the link can be reflected in real time in the link status information table, thereby implementing that the control manager may generate a corresponding control signal according to the link status information table.

For example, if it is determined that the link in the primary optical packet switch is abnormal, the control manager updates the link status information in the link status information table from 0 to 1; if it is determined that the link in the secondary optical packet switch is abnormal, the control manager updates the link status information in the link status information table from 1 to 2. The link status information 0 in the link status information table indicates that the link is normal, the link status information 1 indicates that the corresponding link in the primary optical packet switch is abnormal, and the link status information 2 indicates that the corresponding link in the secondary optical packet switch is abnormal. When the link status information is updated to that the corresponding link in the secondary optical packet switch is abnormal, the corresponding link in the primary optical packet switch is abnormal and the corresponding link in the secondary optical packet switch is abnormal. Specifically, the link status information table before an update may be shown as the following table:

|  | Output Port 1 | Output Port 2 | . . . | Output Port M |
|---|---|---|---|---|
| Input Port 1 | 0 | 0 | 0 | 0 |
| Input Port 2 | 0 | 0 | 0 | 0 |
| . | . | . | . | . |
| . | . | . | . | . |
| . | . | . | . | . |
| Input Port N | 0 | 0 | 0 | 0 |

In this embodiment of the present invention, when the control manager determines that a link for switching from an input port 1 to an output port 2 in the primary optical packet switch is abnormal, the control manager updates status information corresponding to the link for switching from the input port 1 to the output port 2 in the link status information table from 0 to 1, and the link status information table after the update may be shown as the following table:

|  | Output Port 1 | Output Port 2 | . . . | Output Port M |
|---|---|---|---|---|
| Input Port 1 | 0 | 1 | 0 | 0 |
| Input Port 2 | 0 | 0 | 0 | 0 |
| . | . | . | . | . |
| . | . | . | . | . |
| . | . | . | . | . |
| Input Port N | 0 | 0 | 0 | 0 |

In this embodiment of the present invention, when the control manager determines that a link for switching from an input port 1 to an output port 2 in the secondary optical packet switch is abnormal, the control manager updates status information corresponding to the link for switching from the input port 1 to the output port 2 in the link status information table from 1 to 2, and the link status information table after the update may be shown as the following table:

|  | Output Port 1 | Output Port 2 | . . . | Output Port M |
|---|---|---|---|---|
| Input Port 1 | 0 | 2 | 0 | 0 |
| Input Port 2 | 0 | 0 | 0 | 0 |
| . | . | . | . | . |
| . | . | . | . | . |
| . | . | . | . | . |
| Input Port N | 0 | 0 | 0 | 0 |

506: When the enabling signal is inactive, if the alarm signal sent by the link determining device is not received, the control manager performs a zero assignment operation on a quantity of link alarm times.

In this embodiment of the present invention, when the enabling signal is inactive, if a quantity of alarm times of a specific link is not 0 and the quantity of link alarm times is less than the preset threshold although the quantity of link alarm times is not 0, the link is still in a normal state. In this embodiment of the present invention, the zero assignment operation is performed on the quantity of alarm times of the link that does not receive the alarm signal, which can implement that the control manager may subsequently determine again whether the link is abnormal.

Optionally, step 506 may also be: within preset duration from a time at which the enabling signal is activated to a time at which the enabling signal is deactivated, if the alarm signal sent by the link determining device is not received, the control manager performs the zero assignment operation on the quantity of link alarm times.

In this embodiment of the present invention, corresponding enabling signal activation duration in the control manager is the same as that in the link determining device, and a delay exists when the link determining device sends the alarm signal to the control manager. Therefore, a case exists in which the link determining device sends the alarm signal to the control manager within the enabling signal activation duration but the control manager receives the alarm signal after the enabling signal is deactivated. In this embodiment of the present invention, the control manager determines, within the preset duration from the time at which the enabling signal is activated to the time at which the enabling signal is deactivated, whether the alarm signal sent by the link determining device is received, which can avoid a case, in which the control manager obtains a false determining result about whether the alarm signal is received, caused by that the link determining device sends the alarm signal to the control manager within the enabling signal activation duration but the control manager receives the alarm signal after the enabling signal is deactivated. Therefore, accuracy of determining, by the control manager, whether the link is abnormal can be improved.

The preset duration may be configured in advance by the control manager, which is not limited in this embodiment of the present invention. For example, the preset duration may be two milliseconds, three milliseconds, or five milliseconds.

Figure 10:
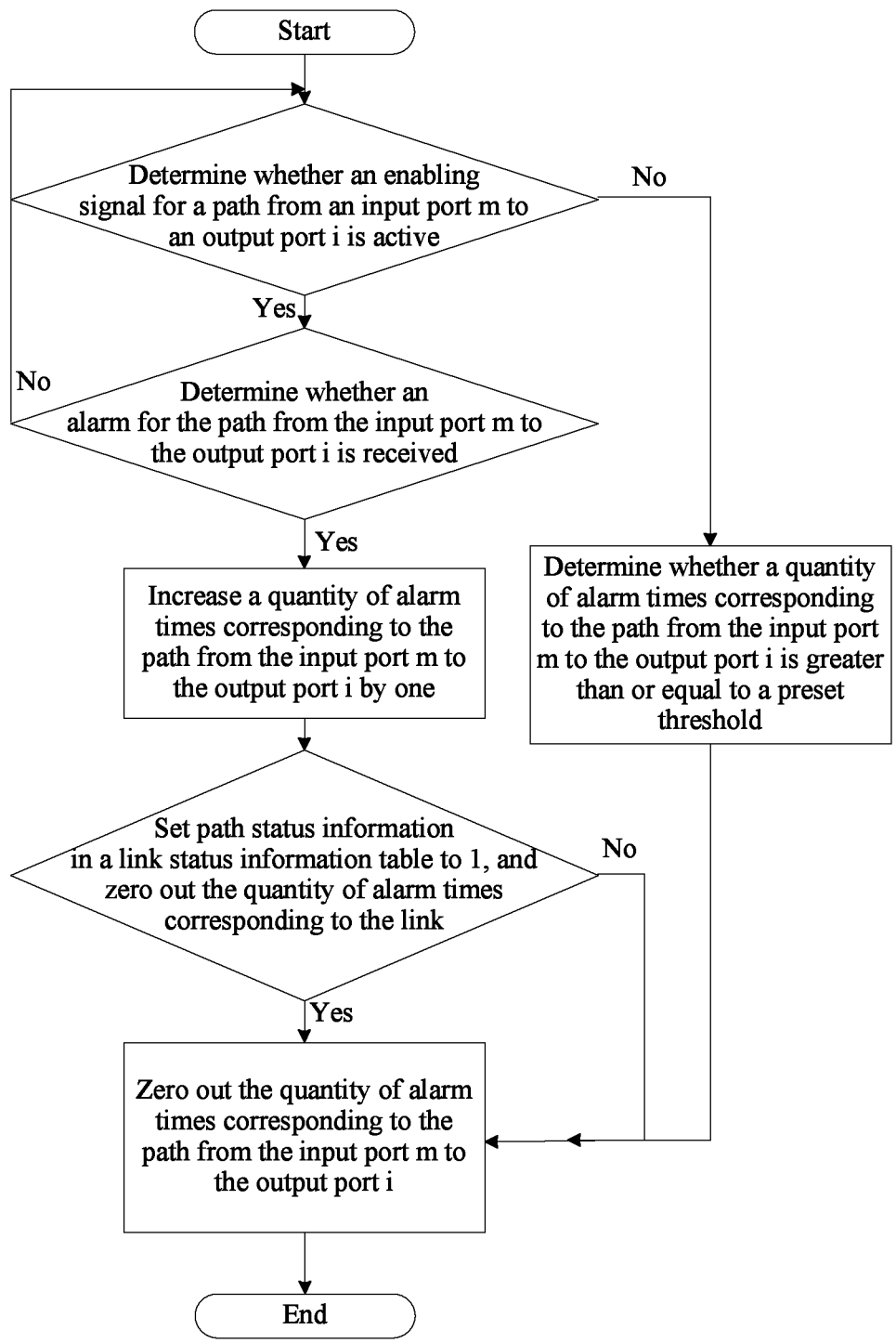
FIG. 10 is a flowchart for determining whether a link is abnormal according to Embodiment 2 of the present invention.

In this embodiment of the present invention, a specific step in which the control manager determines, according to the alarm signal sent by the link determining device, whether the link is abnormal is shown in FIG. 10.

In this embodiment of the present invention, the control manager may calculate, according to the routing information, a next hop optical label of the optical packet after switching, so that the optical packet after switching is coupled with the next hop optical label. The next hop optical label is an optical label, on a next hop optical packet switch, corresponding to the optical packet after switching.

Figure 11:
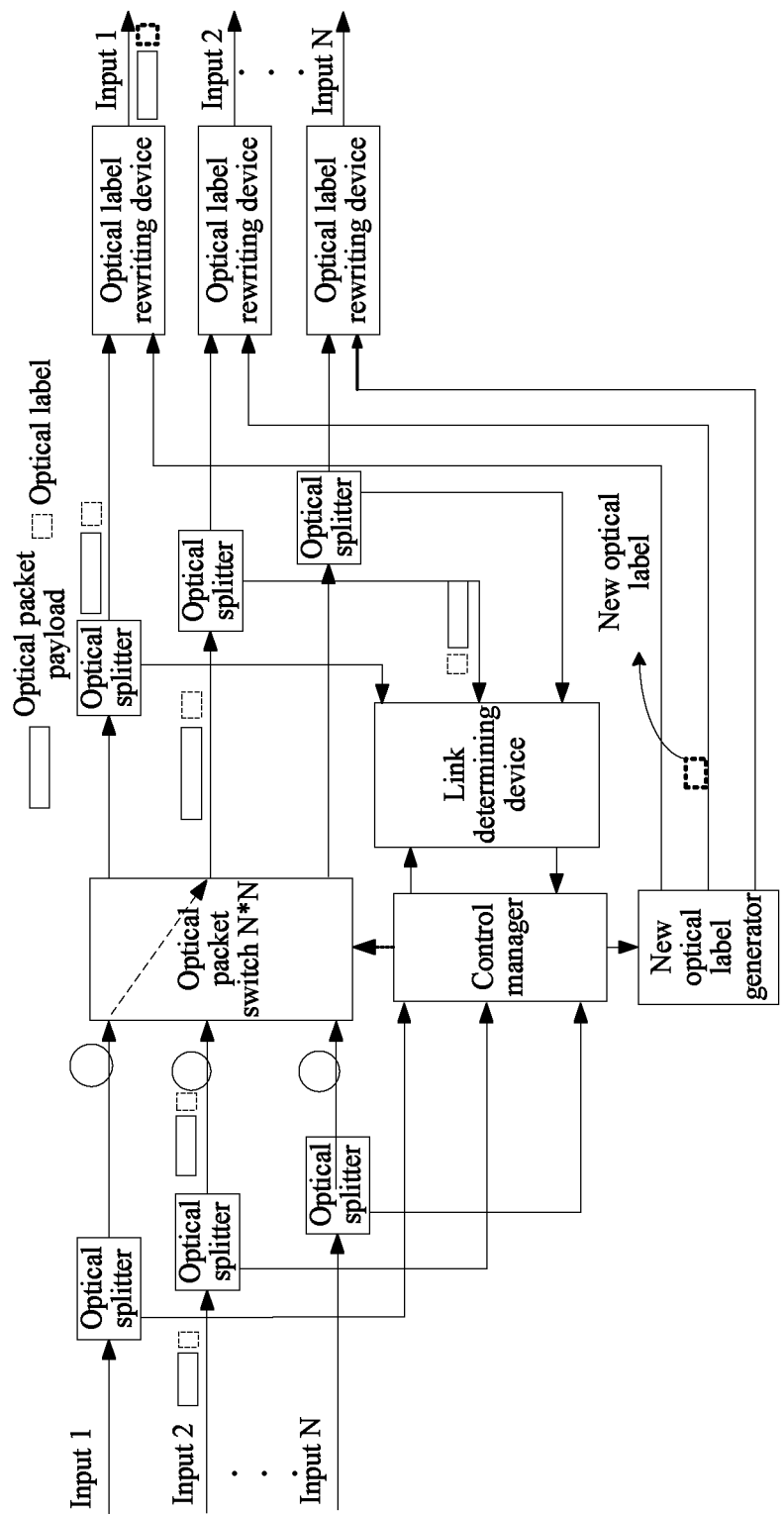
FIG. 11 is a block diagram of a link determining system for a multi-hop optical packet switching system according to Embodiment 2 of the present invention.

This embodiment of the present invention is also applicable to a multi-hop optical packet switching system. Specifically, for example, as shown in FIG. 11, the control manager may send a next hop optical label to a new optical label generator, so that the new optical label generator generates a new optical label according to the next hop optical label, and sends the new optical label to an optical label rewriting device, so that the optical label rewriting device couples the optical packet after switching with the new optical label.

Figure 12:
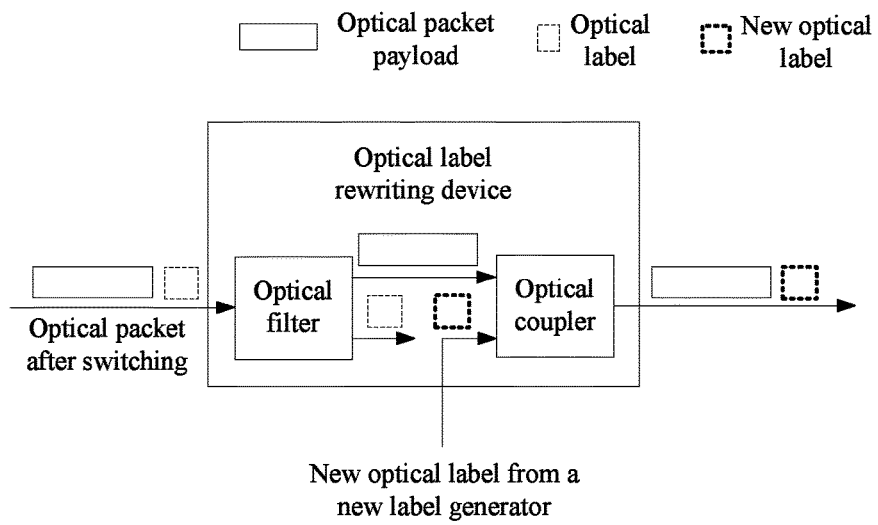
FIG. 12 is a schematic structural diagram of an optical label rewriting device according to Embodiment 2 of the present invention.

An implementation method of the optical label rewriting device may be decided according to an optical label transmission manner. For example, if an optical label is transmitted by using a wavelength different from that used for transmitting an optical packet payload, a result from the optical label rewriting device may be shown in FIG. 12. The optical label rewriting device may include an optical filter and an optical multiplexer. The optical filter may be configured to separate an original optical label from an optical packet payload, and the optical multiplexer may be configured to couple the optical packet payload with a new optical label.

In this embodiment of the present invention, as shown in FIG. 1, an optical packet inputted from each input port may first pass through an optical splitter, so that the optical splitter splits the optical packet into two parts. One part includes a large portion of optical energy, and the other part includes a small portion of the optical energy. The large portion of the optical energy enters the optical packet switch, and the small portion of the optical energy enters the control manager. For example, the optical splitter may distribute 90% of the optical energy of the optical packet to the optical packet switch, and distribute the remaining 10% of the optical energy to the control manager; or the optical splitter may distribute 85% of the optical energy of the optical packet to the optical packet switch, and distribute the remaining 15% of the optical energy to the control manager.

In this embodiment of the present invention, before the optical packet enters the optical packet switch, the optical splitter splits the optical packet into two parts, and a large portion of the optical energy enters the optical packet switch, and the remaining small portion of the optical energy enters the control manager, which can implement that the control manager extracts routing information according to the small portion of the optical energy, generates a control signal, reference optical label information, and an enabling signal, and then controls the optical packet switch to perform optical packet switching for the large portion of the optical energy.

Optionally, after the optical packet is split into two parts by the optical splitter, the large portion of the optical energy may first pass through an optical fiber delay line with a specific length, and then enter the optical packet switch. In this embodiment of the present invention, the large portion of the optical energy enters the optical packet switch after passing through the optical fiber delay line with a specific length, and therefore sufficient time can be reserved for the control manager to generate the corresponding control signal. Then, before the large portion of the optical energy enters the optical packet switch, the optical packet switch may control, according to the control signal, a corresponding optical packet switching link to be generated.

Figure 13:
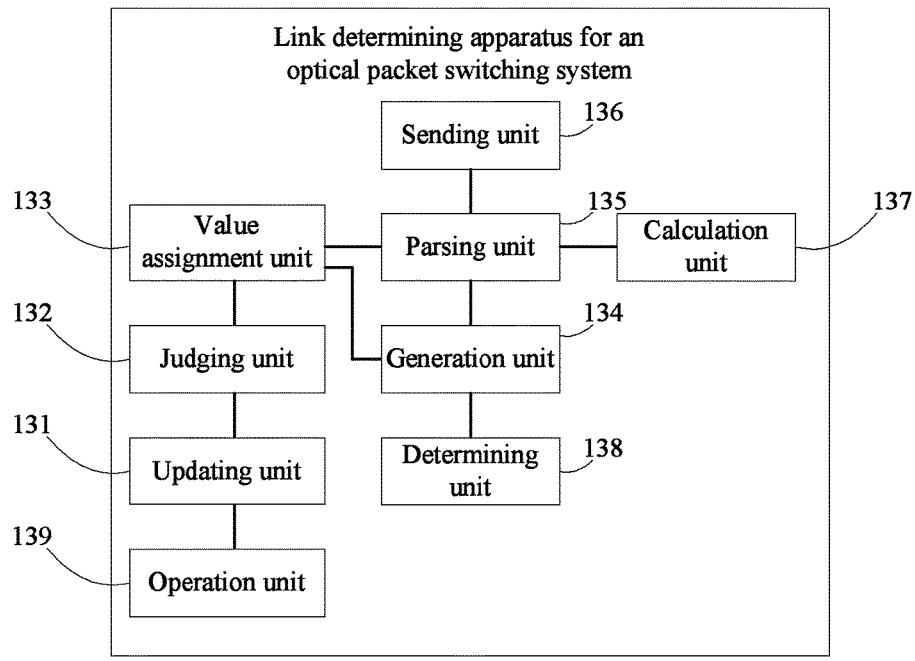
FIG. 13 is a schematic structural diagram of a link determining apparatus for an optical packet switching system according to Embodiment 2 of the present invention.

Further, as specific implementation of the method shown in FIG. 5, this embodiment of the present invention provides a link determining apparatus for an optical packet switching system, as shown in FIG. 13. An entity of the apparatus may be a control manager, and the apparatus includes a parsing unit 131, a generation unit 132, a sending unit 133, a judging unit 134, and a determining unit 135.

The parsing unit 131 is configured to parse out routing information carried in an optical label of an optical packet before switching.

The generation unit 132 is configured to generate reference optical label information and an enabling signal according to the routing information parsed out by the parsing unit 131.

The sending unit 133 is configured to send the reference optical label information and the enabling signal that are generated by the generation unit 132 to a link determining device.

The judging unit 134 is configured to: when the enabling signal sent by the sending unit 133 is active, determine whether an alarm signal sent by the link determining device is received.

The determining unit 135 is configured to: when the judging unit 134 determines that the alarm signal sent by the link determining device is received, determine, according to the alarm signal, whether a link corresponding to the alarm signal is abnormal.

The reference optical label information generated by the generation unit 132 is at least one type of information included in various information types of the routing information.

The various information types of the routing information may include source port information, destination port information, packet length information, or priority information.

The enabling signal generated by the generation unit 132 is used to trigger the link determining device to detect whether a link is abnormal.

Optionally, the apparatus may further include an operation unit 136.

The operation unit 136 is configured to increase a quantity of link alarm times by one when the judging unit 134 determines that the alarm signal sent by the link determining device is received.

The judging unit 135 is further configured to determine whether the quantity of link alarm times that is increased by one by the operation unit 136 is greater than a preset threshold.

The determining unit 135 is further configured to: when the judging unit determines that the quantity of link alarm times that is increased by one is greater than the preset threshold, determine that the link is abnormal.

Optionally, the apparatus may further include an updating unit 137.

The updating unit 137 is configured to update link status information in a link status information table from normal to abnormal when the determining unit 135 determines that the link is abnormal.

The determining unit 136 is further configured to determine enabling signal activation duration according to the packet length information.

The enabling signal activation duration is used to determine a time at which the enabling signal is deactivated.

Optionally, the apparatus may further include a value assignment unit 138.

The value assignment unit 138 is further configured to perform a zero assignment operation on the quantity of link alarm times when the enabling signal is inactive and the judging unit 134 determines that the alarm signal sent by the link determining device is not received.

The link determined by the determining unit 135 is a link in a primary optical packet switch or a link in a secondary optical packet switch.

The determining unit 135 is specifically configured to: when the judging unit 134 determines that an alarm signal that corresponds to the link in the primary optical packet switch and that is sent by the link determining device is received, determine, according to the alarm signal that corresponds to the link in the primary optical packet switch, whether the link in the primary optical packet switch is abnormal.

The sending unit 133 is further configured to: when the determining unit 135 determines that the link in the primary optical packet switch is abnormal, send a primary/secondary selection control signal to an optical packet switch.

The determining unit 135 is further specifically configured to: when the judging unit 134 determines that an alarm signal that corresponds to the link in the secondary optical packet switch and that is sent by the link determining device is received, determine, according to the alarm signal that corresponds to the link in the secondary optical packet switch, whether the link in the secondary optical packet switch is abnormal.

The updating unit 137 is specifically configured to: when the determining unit 135 determines that the link in the primary optical packet switch is abnormal, update link status information in the link status information table from normal to that the primary optical packet switch is abnormal.

The updating unit 137 is further specifically configured to: when the determining unit 135 determines that the link in the secondary optical packet switch is abnormal, update link status information in the link status information table from that the primary optical packet switch is abnormal to that the secondary optical packet switch is abnormal.

The generation unit 132 is further configured to generate a selection control signal according to the routing information.

The selection control signal carries identification information corresponding to an output port of the optical packet after switching.

The sending unit 133 is further configured to send the selection control signal generated by the generation unit 132 to the link determining device.

Optionally, the apparatus may further include a calculation unit 139.

The calculation unit 139 is configured to calculate, according to the routing information, a next hop optical label, parsed out by the parsing unit 131, of the optical packet after switching.

The next hop optical label may be an optical label, on a next hop optical packet switch, corresponding to the optical packet after switching.

It should be noted that, for other corresponding descriptions corresponding to each functional unit in the link determining apparatus for an optical packet switching system provided in this embodiment of the present invention, reference may be made to the corresponding descriptions in FIG. 5, which are not described herein.

Figure 14:
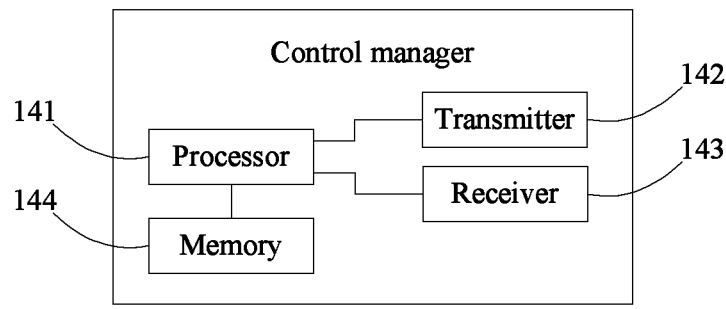
FIG. 14 is a schematic structural diagram of a control manager according to Embodiment 2 of the present invention.

Still further, an entity of the link determining apparatus for an optical packet switching system may be a control manager, as shown in FIG. 14. The control manager may include a processor 141, a transmitter 142, a receiver 143, and a memory 144, where the receiver 143 and the memory 144 are both connected to the processor 141.

The processor 141 is configured to parse out routing information carried in an optical label of an optical packet before switching.

The processor 141 is further configured to generate reference optical label information and an enabling signal according to the routing information.

The transmitter 142 is configured to send the reference optical label information and the enabling signal that are generated by the processor 141 to a link determining device.

The processor 141 is further configured to: when the enabling signal sent by the transmitter 142 is active, determine whether an alarm signal sent by the link determining device is received.

The processor 141 is further configured to: when it is determined that the alarm signal sent by the link determining device is received, determine, according to the alarm signal, whether a link corresponding to the alarm signal is abnormal.

The reference optical label information generated by the processor 141 is at least one type of information included in various information types of the routing information.

The various information types of the routing information may include source port information, destination port information, packet length information, or priority information.

The enabling signal generated by the processor 141 is used to trigger the link determining device to detect whether a link is abnormal.

The processor 141 is further configured to increase a quantity of link alarm times by one when it is determined that the alarm signal sent by the link determining device is received.

The processor 141 is further configured to determine whether the quantity of link alarm times that is increased by one is greater than a preset threshold.

The processor 141 is further configured to: when the judging unit determines that the quantity of link alarm times that is increased by one is greater than the preset threshold, determine that the link is abnormal.

The processor 141 is further configured to update link status information in a link status information table from normal to abnormal when it is determined that the link is abnormal.

The processor 141 is further configured to determine enabling signal activation duration according to the packet length information.

The enabling signal activation duration is used to determine a time at which the enabling signal is deactivated.

The processor 141 is further configured to perform a zero assignment operation on the quantity of link alarm times when the enabling signal is inactive and the alarm signal sent by the link determining device is not received.

The link determined by the processor 141 is a link in a primary optical packet switch or a link in a secondary optical packet switch.

The processor 141 is specifically configured to: when it is determined that an alarm signal that corresponds to the link in the primary optical packet switch and that is sent by the link determining device is received, determine, according to the alarm signal that corresponds to the link in the primary optical packet switch, whether the link in the primary optical packet switch is abnormal.

The transmitter 142 is further configured to: when the processor 141 determines that the link in the primary optical packet switch is abnormal, send a primary/secondary selection control signal to an optical packet switch.

The processor 141 is further specifically configured to: when it is determined that an alarm signal that corresponds to the link in the secondary optical packet switch and that is sent by the link determining device is received, determine, according to the alarm signal that corresponds to the link in the secondary optical packet switch, whether the link in the secondary optical packet switch is abnormal.

The processor 141 is specifically configured to: when it is determined that the link in the primary optical packet switch is abnormal, update link status information in the link status information table from normal to that the primary optical packet switch is abnormal.

The processor 141 is further specifically configured to: when it is determined that the link in the secondary optical packet switch is abnormal, update link status information in the link status information table from that the primary optical packet switch is abnormal to that the secondary optical packet switch is abnormal.

The processor 141 is further configured to generate a selection control signal according to the routing information.

The selection control signal carries identification information corresponding to an output port of the optical packet after switching.

The transmitter 142 is further configured to send the selection control signal generated by the processor 141 to the link determining device.

The processor 141 is further configured to calculate, according to the routing information, a next hop optical label of the parsed optical packet after switching.

The next hop optical label may be an optical label, on a next hop optical packet switch, corresponding to the optical packet after switching.

It should be noted that, for other corresponding descriptions corresponding to each device in the control manager provided in this embodiment of the present invention, reference may be made to the corresponding descriptions in FIG. 5, which are not described herein.

According to the link determining method, apparatus, and system for an optical packet switching system provided in the embodiments of the present invention, first, a control manager generates reference optical label information and an enabling signal, and sends the reference optical label information and the enabling signal to a link determining device; then, when the enabling signal is active, the link determining device determines, according to parsed-out actual optical label information and the received reference optical label information, whether an alarm signal is generated, and if it is determined that the alarm signal is generated, sends the alarm signal to the control manager; and finally, the control manager further determines, according to the received alarm signal, whether a link corresponding to the alarm signal is abnormal. In the prior art, a test signal before switching by an optical packet switch is coupled at a circulator at each output port of the optical packet switch, and the test signal after switching by the optical packet switch is obtained at a circulator at each input port of the optical packet switch. In comparison, in the embodiments of the present invention, an optical label before switching by an optical packet switch and the optical label after switching by the optical packet switch are obtained, which can avoid that a test signal is coupled by using a circulator at each output port of the optical packet switch, and also avoid that the test signal is separated at a circulator at each input port of the optical packet switch, thereby reducing optical packet switching costs.

Embodiment 3

Figure 15:
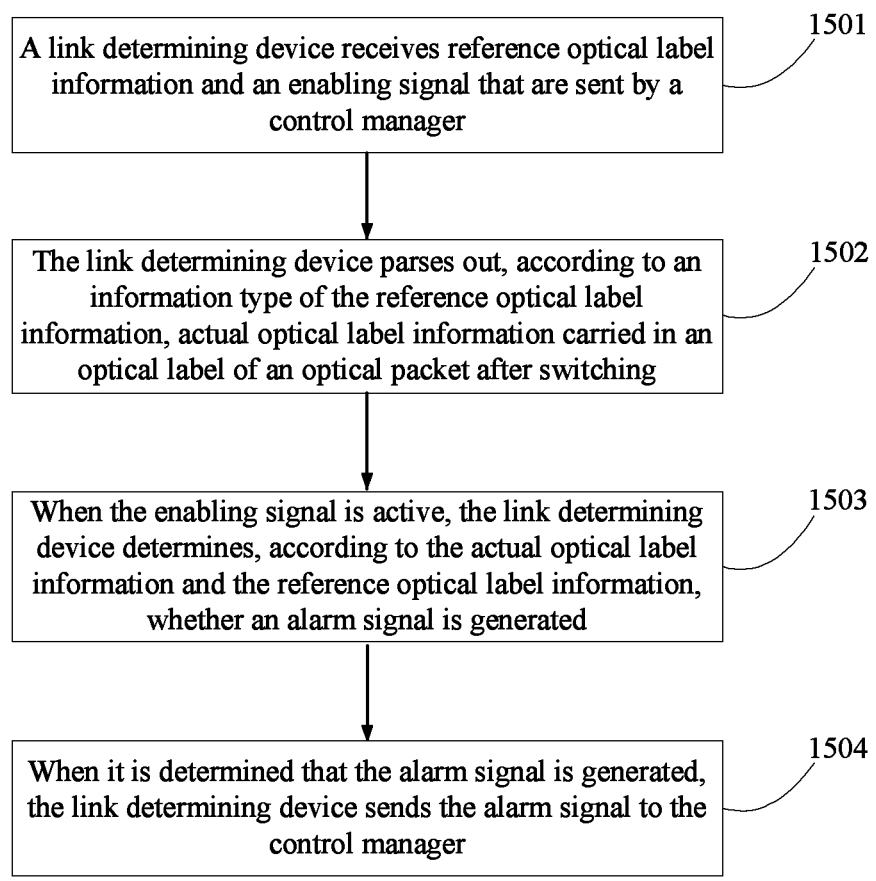
FIG. 15 is a flowchart of a link determining method for an optical packet switching system according to Embodiment 3 of the present invention.

This embodiment of the present invention provides a link determining method for an optical packet switching system, as shown in FIG. 15. The method includes:

1501: A link determining device receives reference optical label information and an enabling signal that are sent by a control manager.

A reference optical label may be at least one information type included in information types. The information type may include source port information, destination port information, packet length information, priority information, or the like. For example, the reference optical label information may be the source port information, or the reference optical label information may be the packet length information, or the reference optical label information may be the destination port information and the priority information, or the reference optical label information may be the source port information, the destination port information, the packet length information, and the priority information.

In this embodiment of the present invention, the reference optical label information is used as a reference for the link determining device to detect whether a link is abnormal. Specifically, the link determining device first calculates, according to the reference optical label information generated by the control manager before optical packet switching and parsed-out optical label information in an optical label after switching by an optical packet switch, a mismatch degree between the reference optical label information and the actual optical label information, then determines whether the mismatch degree between the reference optical label information and the actual optical label information is greater than or equal to a preset threshold, and finally determines, according to a determining result, whether an alarm signal corresponding to the link is generated.

Optionally, the reference optical label information may include many types of information. In this embodiment of the present invention, because the reference optical label information is used as a reference for determining whether the link is abnormal, more information items included in the reference optical label information indicate higher accuracy of determining, by the link determining device, whether the alarm signal corresponding to the link is generated.

Alternatively, the reference optical label information may include a few types of information. In this embodiment of the present invention, because the reference optical label information is used as a reference for determining whether the link is abnormal, less information items included in the reference optical label information indicate lower complexity of determining, by the link determining device, whether the alarm signal corresponding to the link is generated.

In this embodiment of the present invention, the enabling signal is used to trigger the link determining device to detect whether a link is abnormal. Specifically, only when an enabling signal corresponding to a link from an input port m to an output port i is active, the link determining device can determine, according to the mismatch degree between the reference optical label information generated by the control manager before optical packet switching and the parsed-out optical label information in the optical label after switching by the optical packet switch, whether an alarm signal corresponding to the link is generated, and the control manager can determine whether the link is abnormal. m is an integer greater than or equal to 1 and less than or equal to N, i is an integer greater than or equal to 1 and less than or equal to M, N is a quantity of input ports of the optical packet switch, M is a quantity of output ports of the optical packet switch, N and M are both integers greater than or equal to 1, and generally, M may be equal to N.

1502: The link determining device parses out, according to an information type of the reference optical label information, actual optical label information carried in an optical label of an optical packet after switching.

An information type of the actual optical label information is the same as that of the reference optical label information. The information type may include the source port information, the destination port information, the packet length information, the priority information, or the like. For example, when the reference optical label information is the source port information, the link determining device parses out source port information carried in the optical label after switching, and uses the source port information as the actual optical label information; when the reference optical label information is the packet length information, the link determining device parses out packet length information carried in the optical label after switching, and uses the packet length information as the actual optical label information; when the reference optical label information is the destination port information and the priority information, the link determining device parses out port information and priority information that are carried in the optical label after switching, and uses the information as the actual optical label information; when a reference optical label is the source port information, the destination port information, the packet length information, and the priority information, the link determining device parses out source port information, destination port information, packet length information, and priority information that are carried in the optical label after switching, and uses the information as the actual optical label information.

1503: When the enabling signal is active, the link determining device determines, according to the actual optical label information and the reference optical label information, whether an alarm signal is generated.

Specifically, when the mismatch degree is relatively high between the actual optical label information and the reference optical label information, a link for performing optical packet switching is abnormal, and the link determining device determines that an alarm signal corresponding to the link is generated; otherwise, when the mismatch degree is relatively low between the between the actual optical label information and the reference optical label information, a link for performing optical packet switching is normal, and the link determining device determines that an alarm signal corresponding to the link is not generated.

1504: When it is determined that the alarm signal is generated, the link determining device sends the alarm signal to the control manager.

Further, the control manager determines, according to the alarm signal sent by the link determining device, whether the link corresponding to the alarm signal is abnormal.

In this embodiment of the present invention, as shown in FIG. 1, an optical packet inputted from each input port may first pass through an optical splitter, so that the optical splitter splits the optical packet into two parts. One part includes a large portion of optical energy, and the other part includes a small portion of the optical energy. The large portion of the optical energy enters the optical packet switch, and the small portion of the optical energy enters the control manager. For example, the optical splitter may distribute 90% of the optical energy of the optical packet to the optical packet switch, and distribute the remaining 10% of the optical energy to the control manager; or the optical splitter may distribute 85% of the optical energy of the optical packet to the optical packet switch, and distribute the remaining 15% of the optical energy to the control manager.

In this embodiment of the present invention, before the optical packet enters the optical packet switch, the optical splitter splits the optical packet into two parts, and a large portion of the optical energy enters the optical packet switch, and the remaining small portion of the optical energy enters the control manager, which can implement that the control manager extracts routing information according to the small portion of the optical energy, generates a control signal, reference optical label information, and an enabling signal, and then controls the optical packet switch to perform optical packet switching for the large portion of the optical energy.

Optionally, after the optical packet is split into two parts by the optical splitter, the large portion of the optical energy may first pass through an optical fiber delay line with a specific length, and then enter the optical packet switch. In this embodiment of the present invention, the large portion of the optical energy enters the optical packet switch after passing through the optical fiber delay line with a specific length, and therefore sufficient time can be reserved for the control manager to generate the corresponding control signal. Then, before the large portion of the optical energy enters the optical packet switch, the optical packet switch may control, according to the control signal, a corresponding optical packet switching link to be generated.

Figure 16:
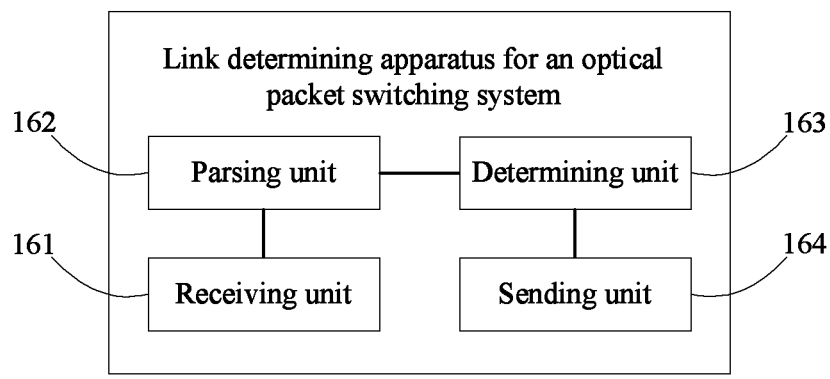
FIG. 16 is a schematic structural diagram of a link determining apparatus for an optical packet switching system according to Embodiment 3 of the present invention.

Further, as specific implementation of the method shown in FIG. 15, this embodiment of the present invention provides a link determining apparatus for an optical packet switching system, as shown in FIG. 16. An entity of the apparatus may be a link determining device, and the apparatus includes a receiving unit 161, a parsing unit 162, a determining unit 163, and a sending unit 164.

The receiving unit 161 is configured to receive reference optical label information and an enabling signal that are sent by a control manager.

The parsing unit 162 is configured to parse out, according to an information type of the reference optical label information received by the receiving unit 161, actual optical label information carried in an optical label of an optical packet after switching.

The determining unit 163 is configured to: when the enabling signal received by the receiving unit 161 is active, determine, according to the actual optical label information parsed out by the parsing unit 162 and the reference optical label information received by the receiving unit 161, whether an alarm signal is generated.

The sending unit 164 is configured to: when the determining unit 163 determines that the alarm signal is generated, send the alarm signal to the control manager.

It should be noted that, for other corresponding descriptions corresponding to each functional unit in the link determining apparatus for an optical packet switching system provided in this embodiment of the present invention, reference may be made to the corresponding descriptions in FIG. 15, which are not described herein.

Figure 17:
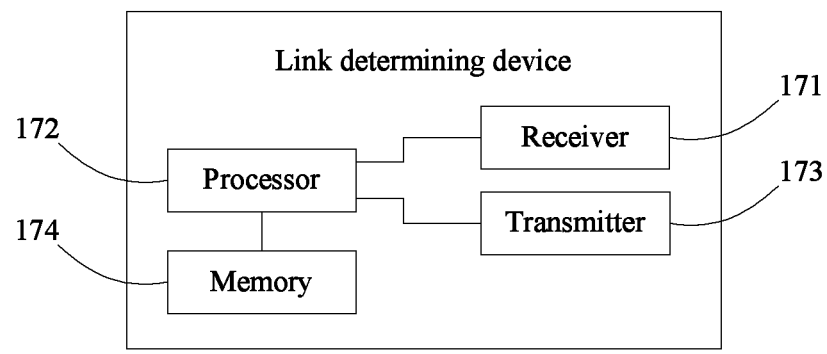
FIG. 17 is a schematic structural diagram of a link determining device according to Embodiment 3 of the present invention.

Still further, an entity of the link determining apparatus for an optical packet switching system may be a link determining device, as shown in FIG. 17. The link determining device may include a receiver 171, a processor 172, a transmitter 173, and a memory 174, where the memory 174 is connected to the processor 172.

The receiver 171 is configured to receive reference optical label information and an enabling signal that are sent by a control manager.

The processor 172 is configured to parse out, according to an information type of the reference optical label information received by the receiver 171, actual optical label information carried in an optical label of an optical packet after switching.

The processor 172 is configured to: when the enabling signal received by the receiver 171 is active, determine, according to the actual optical label information and the reference optical label information that is received by the receiver 171, whether an alarm signal is generated.

The transmitter 173 is configured to: when the processor 172 determines that the alarm signal is generated, send the alarm signal to the control manager.

It should be noted that, for other corresponding descriptions corresponding to each device in the link determining device provided in this embodiment of the present invention, reference may be made to the corresponding descriptions in FIG. 15, which are not described herein.

According to the link determining method, apparatus, and system for an optical packet switching system provided in the embodiments of the present invention, first, a control manager generates reference optical label information and an enabling signal, and sends the reference optical label information and the enabling signal to a link determining device; then, when the enabling signal is active, the link determining device determines, according to parsed-out actual optical label information and the received reference optical label information, whether an alarm signal is generated, and if it is determined that the alarm signal is generated, sends the alarm signal to the control manager; and finally, the control manager further determines, according to the received alarm signal, whether a link corresponding to the alarm signal is abnormal. In the prior art, a test signal before switching by an optical packet switch is coupled at a circulator at each output port of the optical packet switch, and the test signal after switching by the optical packet switch is obtained at a circulator at each input port of the optical packet switch. In comparison, in the embodiments of the present invention, an optical label before switching by an optical packet switch and the optical label after switching by the optical packet switch are obtained, which can avoid that a test signal is coupled by using a circulator at each output port of the optical packet switch, and also avoid that the test signal is separated at a circulator at each input port of the optical packet switch, thereby reducing optical packet switching costs.

Embodiment 4

Figure 18:
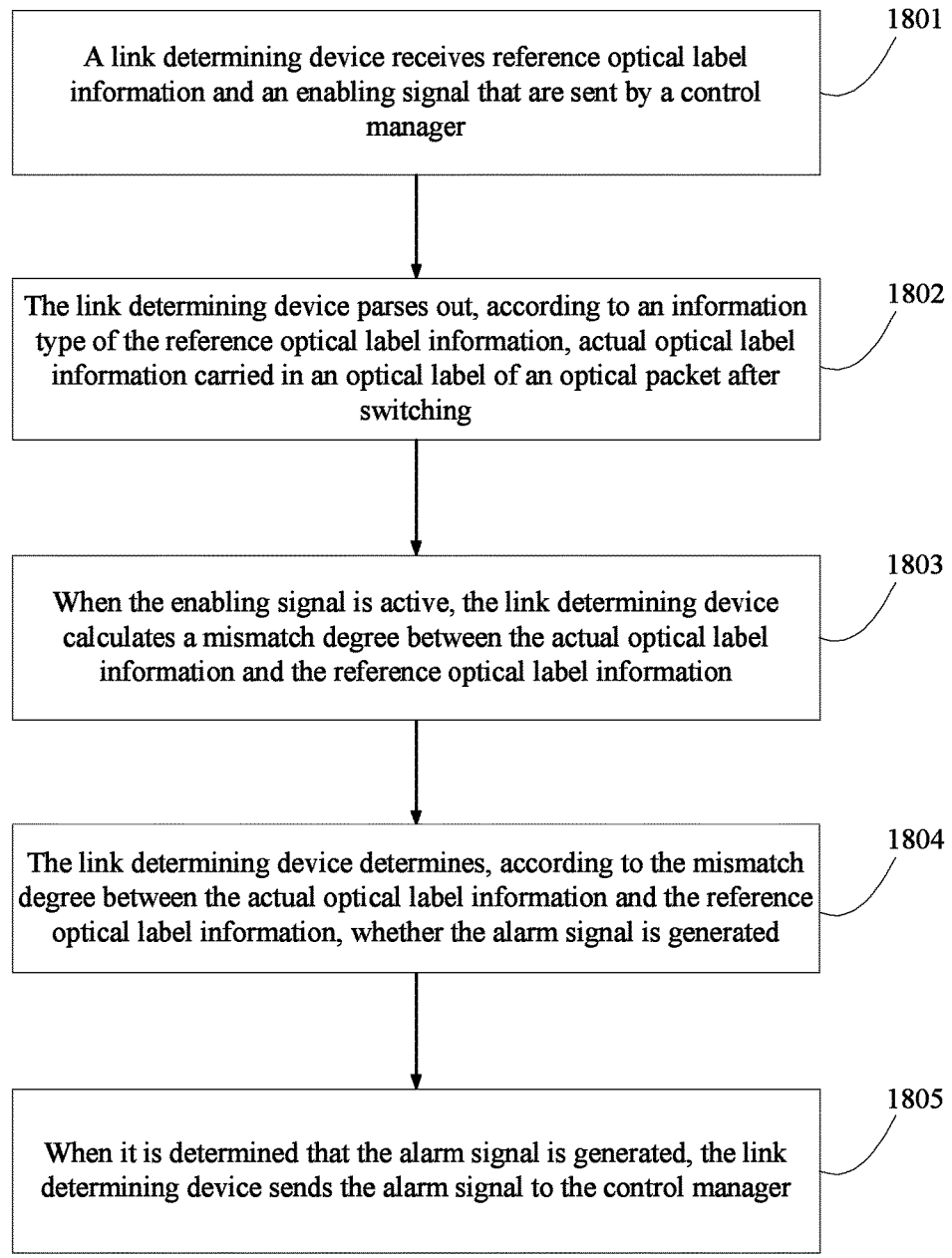
FIG. 18 is a flowchart of a link determining method for an optical packet switching system according to Embodiment 4 of the present invention.

This embodiment of the present invention provides a link determining method for an optical packet switching system, as shown in FIG. 18. The method includes:

1801: A link determining device receives reference optical label information and an enabling signal that are sent by a control manager.

The reference optical label information is at least one information type included in information types. The information type may include source port information, destination port information, packet length information, priority information, or the like. For example, the reference optical label information may be the source port information, or the reference optical label information may be the packet length information, or the reference optical label information may be the destination port information and the priority information, or the reference optical label information may be the source port information, the destination port information, the packet length information, and the priority information.

In this embodiment of the present invention, the reference optical label information is used as a reference for the link determining device to detect whether a link is abnormal. Specifically, the link determining device first calculates, according to the reference optical label information generated by the control manager before optical packet switching and parsed-out optical label information in an optical label after switching by an optical packet switch, a mismatch degree between the reference optical label information and the actual optical label information, then determines whether the mismatch degree between the reference optical label information and the actual optical label information is greater than or equal to a preset threshold, and finally determines, according to a determining result, whether an alarm signal corresponding to the link is generated.

Optionally, the reference optical label information may include many types of information. In this embodiment of the present invention, because the reference optical label information is used as a reference for determining whether the link is abnormal, more information items included in the reference optical label information indicate higher accuracy of determining, by the link determining device, whether the alarm signal corresponding to the link is generated.

Alternatively, the reference optical label information may include a few types of information. In this embodiment of the present invention, because the reference optical label information is used as a reference for determining whether the link is abnormal, less information items included in the reference optical label information indicate lower complexity of determining, by the link determining device, whether the alarm signal corresponding to the link is generated.

In this embodiment of the present invention, the enabling signal is used to trigger the link determining device to detect whether a link is abnormal. Specifically, only when an enabling signal corresponding to a link from an input port m to an output port i is active, the link determining device can determine, according to the mismatch degree between the reference optical label information generated by the control manager before optical packet switching and the parsed-out optical label information in the optical label after switching by the optical packet switch, whether an alarm signal corresponding to the link is generated, and the control manager can determine whether the link is abnormal. m is an integer greater than or equal to 1 and less than or equal to N, i is an integer greater than or equal to 1 and less than or equal to M, N is a quantity of input ports of the optical packet switch, M is a quantity of output ports of the optical packet switch, N and M are both integers greater than or equal to 1, and generally, M may be equal to N.

Figure 19:
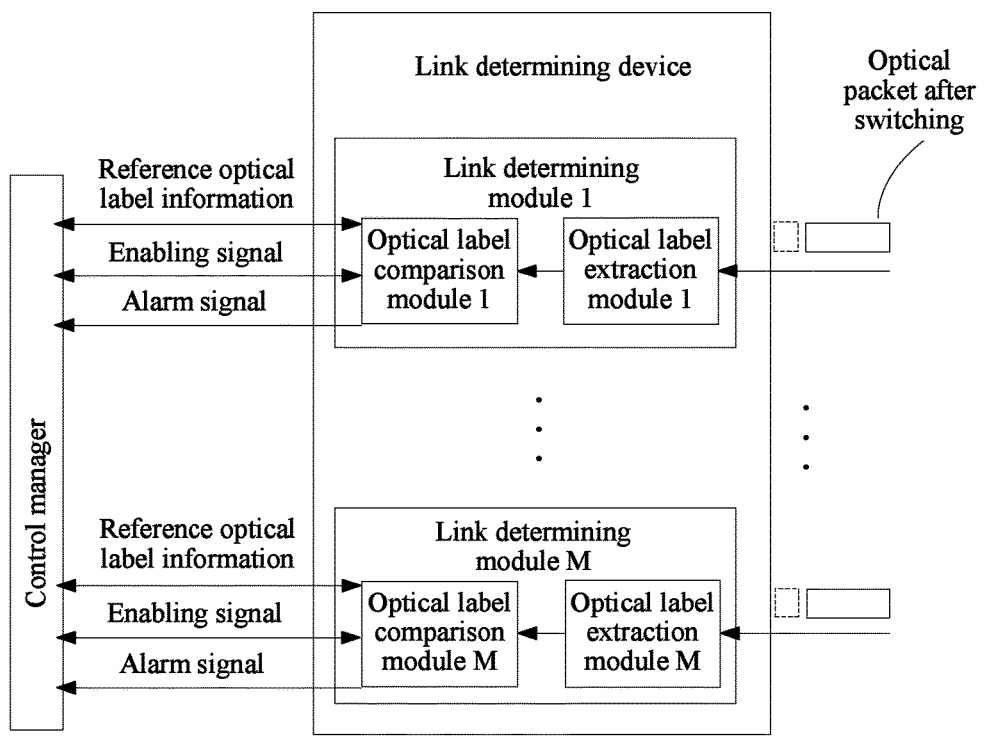
FIG. 19 is a schematic structural diagram of a link determining device according to Embodiment 4 of the present invention.

In this embodiment of the present invention, the link determining device may include M link determining modules, and each link determining module includes an optical label extraction module and an optical label comparison module, as shown in FIG. 19. The M link determining modules are configured to perform link determining respectively for links to M output ports on the optical packet switch. Specifically, the optical label extraction module in the link determining module is configured to extract the actual optical label information from the optical label of an optical packet after switching by the optical packet switch, and the optical label comparison module in the link determining module is configured to compare the actual optical label information label and the reference optical label information.

1802: The link determining device parses out, according to an information type of the reference optical label information, actual optical label information carried in an optical label of an optical packet after switching.

In this embodiment of the present invention, an information type of the actual optical label information is the same as that of the reference optical label information. The information type may include the source port information, the destination port information, the packet length information, the priority information, or the like. For example, when the reference optical label information is the source port information, the link determining device parses out source port information carried in the optical label after switching, and uses the source port information as the actual optical label information; when the reference optical label information is the packet length information, the link determining device parses out packet length information carried in the optical label after switching, and uses the packet length information as the actual optical label information; when the reference optical label information is the destination port information and the priority information, the link determining device parses out port information and priority information that are carried in the optical label after switching, and uses the information as the actual optical label information; when a reference optical label is the source port information, the destination port information, the packet length information, and the priority information, the link determining device parses out source port information, destination port information, packet length information, and priority information that are carried in the optical label after switching, and uses the information as the actual optical label information.

Optionally, before step 1802, the method may further include: the link determining device receives a selection control signal sent by the control manager, and selects an output port of the optical packet after switching from multiple output ports according to identification information corresponding to the output port of the optical packet after switching. In this case, step 1802 may be: the link determining device parses out, according to the reference optical label information and at the output port of the optical packet after switching, the actual optical label information carried in the optical label of the optical packet after switching. The selection control signal carries the identification information corresponding to the output port of the optical packet after switching.

Figure 20:
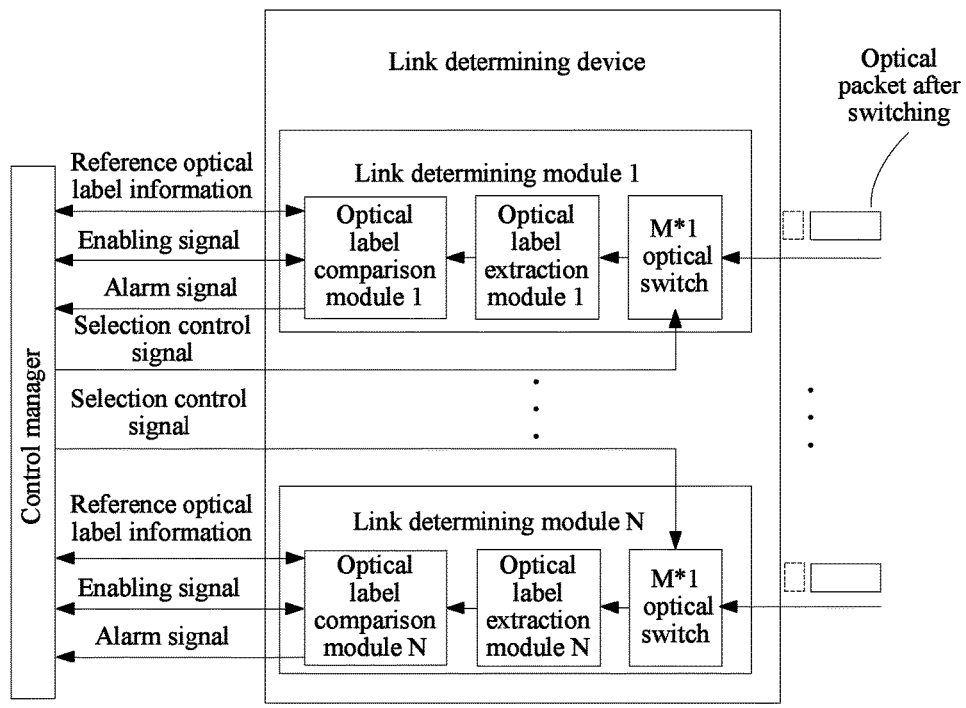
FIG. 20 is a schematic structural diagram of another link determining device according to Embodiment 4 of the present invention.

In this embodiment of the present invention, a K*1 optical switch may be added to the link determining device, as shown in FIG. 20. The K*1 optical switch may be configured to control a connection relationship between K output ports on an optical packet switch and corresponding link determining modules.

In this embodiment of the present invention, the K*1 optical switch is added to the link determining device, so that a quantity of link determining modules in the link determining device is reduced, thereby simplifying a link determining system for an optical packet switching system and facilitating integration of the optical packet switching system. In this embodiment of the present invention, the selection control signal generated by the control manager may control the K*1 optical switch, so as to implement that the K*1 optical switch may select any output port from K different output ports, and send, to a specific link determining module in the link determining device, an optical packet outputted from the output port, to detect whether a link is abnormal. In this case, a link determining selection module may be added to the control manager, as shown in FIG. 8. The link determining selection module is configured to generate a selection control signal.

Optionally, after step 1802, the method may further include: when the enabling signal is inactive, if the actual optical label information carried in the optical label of the optical packet after switching cannot be parsed out, the link determining device determines that the alarm signal is generated.

In this embodiment of the present invention, if the link determining device cannot parse out, within enabling signal activation duration, the actual optical label information of the optical packet after switching, it indicates that a corresponding link is abnormal, and therefore the link determining device generates an alarm signal corresponding to the link.

1803: When the enabling signal is active, the link determining device calculates a mismatch degree between the actual optical label information and the reference optical label information.

In this embodiment of the present invention, the enabling signal is used to trigger the link determining device to determine whether an alarm signal is generated. Specifically, only when an enabling signal corresponding to a link from an input port m to an output port i is active, the link determining device can determine whether an alarm signal corresponding to the link is generated, and the control manager can determine whether the link is abnormal. m is an integer greater than or equal to 1 and less than or equal to N, i is an integer greater than or equal to 1 and less than or equal to M, N is a quantity of input ports of the optical packet switch, M is a quantity of output ports of the optical packet switch, N and M are both integers greater than or equal to 1, and generally, M may be equal to N.

For example, FIG. 7 is a schematic diagram of an enabling signal of an optical packet switching apparatus that includes three input ports and three output ports. In the figure, at a time point t1, an input port 1 receives an optical packet that needs to be switched to an output port 2. After a small portion of optical energy of the optical packet passes through the control manager, the control manager may determine an output port to which the optical packet is to be switched. If link status information in a link status information table is normal, optical packet switching may be performed on the optical packet by using the link. In addition, the control manager may obtain, by means of calculation, that the optical packet starts to be outputted from the output port 2 at a time point t2. Therefore, the control manager activates the enabling signal of the link at the time point t2, and the control manager deactivates the enabling signal of the link till the entire optical packet is outputted from the output port 2.

For another example, in FIG. 7, at a time point t3, the input port 1 receives an optical packet that needs to be switched to an output port 3. After a small portion of optical energy of the optical packet passes through the control manager, the control manager may determine an output port to which the optical packet is to be switched. If link status information in the link status information table is normal, optical packet switching may be performed on the optical packet by using the link. In addition, the control manager may obtain, by means of calculation, that the optical packet starts to be outputted from the output port 3 at a time point t4. Therefore, the control manager activates the enabling signal of the link at the time point t4, and the control manager deactivates the enabling signal of the link till the entire optical packet is outputted from the output port 3.

The mismatch degree between the actual optical label information and the reference optical label information is used to indicate a status of an abnormality of the link in an optical packet switching process. Specifically, a higher mismatch degree between the actual optical label information and the reference optical label information indicates a higher probability that the link is abnormal, and a lower mismatch degree between the actual optical label information and the reference optical label information indicates a lower probability that the link is abnormal.

1804: The link determining device determines, according to the mismatch degree between the actual optical label information and the reference optical label information, whether the alarm signal is generated.

Specifically, step 1804 may be: if the mismatch degree between the actual optical label information and the reference optical label information is greater than the preset threshold, the link determining device determines that the alarm signal is generated; or if the mismatch degree between the actual optical label information and the reference optical label information is less than or equal to the preset threshold, the link determining device determines that the alarm signal is not generated.

In this embodiment of the present invention, the optical packet after switching is an optical packet after switching by a primary optical packet switch or an optical packet after switching by a secondary optical packet switch. Specifically, the optical packet switch may be an optical packet switch with primary/secondary protection, as shown in FIG. 9. The optical packet switch with primary/secondary protection may include a primary optical switching matrix, a secondary optical switching matrix, N 1*2 optical switches, and N optical multiplexers.

Optionally, step 1802 may be: the link determining device parses out, according to the reference optical label information, actual optical label information carried in an optical label of the optical packet after switching by the primary optical packet switch. In this case, step 1804 may be: the link determining device determines, according to the actual optical label information carried in the optical label of the optical packet after switching by the primary optical packet switch and the reference optical label information, whether an alarm signal corresponding to a link in the primary optical packet switch is generated. After step 1804, the method may further include: when it is determined that the alarm signal corresponding to the link in the primary optical packet switch is generated, the link determining device sends the alarm signal corresponding to the link in the primary optical packet switch to the control manager.

Alternatively, step 1802 may also be: the link determining device parses out, according to the reference optical label information, actual optical label information carried in an optical label of the optical packet after switching by the secondary optical packet switch. In this case, step 1804 may also be: the link determining device determines, according to the actual optical label information carried in the optical label of the optical packet after switching by the secondary optical packet switch and the reference optical label information, whether an alarm signal corresponding to a link in the secondary optical packet switch is generated. In this case, after step 1804, the method may further include: when it is determined that the alarm signal corresponding to the link in the secondary optical packet switch is generated, the link determining device sends the alarm signal corresponding to the link in the secondary optical packet switch to the control manager.

In this embodiment of the present invention, preferably, the primary optical packet switch may be used to perform optical packet switching. Correspondingly, the link determining device determines whether the alarm signal corresponding to the link in the primary optical packet switch is generated. Only when a specific link in the primary optical packet switch is abnormal, the 1*2 optical switch is used to control a corresponding link in the secondary optical packet switch to perform optical packet switching. Correspondingly, the link determining device determines whether the alarm signal corresponding to the link in the secondary optical packet switch is generated.

In this embodiment of the present invention, the optical packet switch with primary/secondary protection can be used to implement that when a specific link in the primary optical packet switch is abnormal, optical packet switching is performed by using a corresponding link in the secondary optical packet switch, which can avoid as far as possible a case in which optical packet switching cannot be performed in an optical packet switching process due to the abnormal link.

1805: When it is determined that the alarm signal is generated, the link determining device sends the alarm signal to the control manager.

Further, the control manager determines, according to the alarm signal sent by the link determining device, whether the link corresponding to the alarm signal is abnormal.

This embodiment of the present invention is also applicable to a multi-hop optical packet switching system. Specifically, for example, as shown in FIG. 11, the control manager may send a next hop optical label to a new optical label generator, so that the new optical label generator generates a new optical label according to the next hop optical label, and sends the new optical label to an optical label rewriting device, so that the optical label rewriting device couples the optical packet after switching with the new optical label.

An implementation method of the optical label rewriting device may be decided according to an optical label transmission manner. For example, if an optical label is transmitted by using a wavelength different from that used for transmitting an optical packet payload, a result from the optical label rewriting device may be shown in FIG. 12. The optical label rewriting device may include an optical filter and an optical multiplexer. The optical filter may be configured to separate an original optical label from an optical packet payload, and the optical multiplexer may be configured to couple the optical packet payload with a new optical label.

In this embodiment of the present invention, as shown in FIG. 1, an optical packet inputted from each input port may first pass through an optical splitter, so that the optical splitter splits the optical packet into two parts. One part includes a large portion of optical energy, and the other part includes a small portion of the optical energy. The large portion of the optical energy enters the optical packet switch, and the small portion of the optical energy enters the control manager. For example, the optical splitter may distribute 90% of the optical energy of the optical packet to the optical packet switch, and distribute the remaining 10% of the optical energy to the control manager; or the optical splitter may distribute 85% of the optical energy of the optical packet to the optical packet switch, and distribute the remaining 15% of the optical energy to the control manager.

In this embodiment of the present invention, before the optical packet enters the optical packet switch, the optical splitter splits the optical packet into two parts, and a large portion of the optical energy enters the optical packet switch, and the remaining small portion of the optical energy enters the control manager, which can implement that the control manager extracts routing information according to the small portion of the optical energy, generates a control signal, reference optical label information, and an enabling signal, and then controls the optical packet switch to perform optical packet switching for the large portion of the optical energy.

Optionally, after the optical packet is split into two parts by the optical splitter, the large portion of the optical energy may first pass through an optical fiber delay line with a specific length, and then enter the optical packet switch. In this embodiment of the present invention, the large portion of the optical energy enters the optical packet switch after passing through the optical fiber delay line with a specific length, and therefore sufficient time can be reserved for the control manager to generate the corresponding control signal. Then, before the large portion of the optical energy enters the optical packet switch, the optical packet switch may control, according to the control signal, a corresponding optical packet switching link to be generated.

Figure 21:
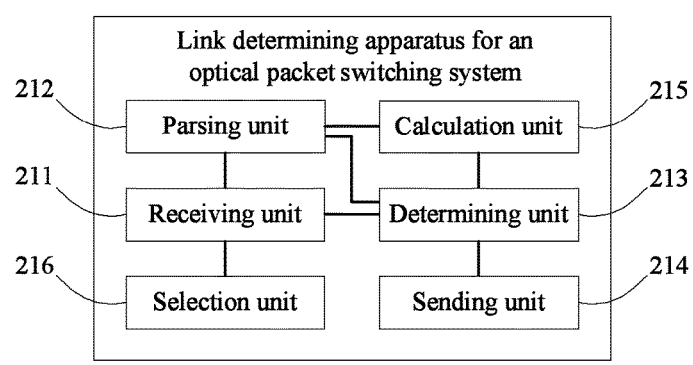
FIG. 21 is a schematic structural diagram of a link determining apparatus for an optical packet switching system according to Embodiment 4 of the present invention.

Further, as specific implementation of the method shown in FIG. 18, this embodiment of the present invention provides a link determining apparatus for an optical packet switching system, as shown in FIG. 21. An entity of the apparatus may be a link determining device, and the apparatus includes a receiving unit 211, a parsing unit 212, a determining unit 213, and a sending unit 214.

The receiving unit 211 is configured to receive reference optical label information and an enabling signal that are sent by a control manager.

The parsing unit 212 is configured to parse out, according to an information type of the reference optical label information received by the receiving unit 211, actual optical label information carried in an optical label of an optical packet after switching.

The determining unit 213 is configured to: when the enabling signal received by the receiving unit 211 is active, determine, according to the actual optical label information parsed out by the parsing unit 212 and the reference optical label information received by the receiving unit 211, whether an alarm signal is generated.

The sending unit 214 is configured to: when the determining unit 213 determines that the alarm signal is generated, send the alarm signal to the control manager.

An information type of the actual optical label information parsed out by the parsing unit 212 is the same as that of the reference optical label information received by the receiving unit 211.

The information type includes source port information, destination port information, packet length information, or priority information.

The reference optical label information received by the receiving unit 211 is at least one information type included in the information type.

Optionally, the apparatus may further include a calculation unit 215.

The calculation unit 215 is configured to calculate a mismatch degree between the actual optical label information parsed out by the parsing unit 212 and the reference optical label information received by the receiving unit 211.

The determining unit 213 is specifically configured to determine, according to the mismatch degree, calculated by the calculation unit 215, between the actual optical label information and the reference optical label information, whether the alarm signal is generated.

The determining unit 213 is specifically configured to: when the mismatch degree between the actual optical label information and the reference optical label information is greater than a preset threshold, determine that the alarm signal is generated.

The determining unit 213 is further specifically configured to: when the mismatch degree between the actual optical label information and the reference optical label information is less than or equal to a preset threshold, determine that the alarm signal is not generated.

The receiving unit 211 is further configured to receive a selection control signal sent by the control manager.

The selection control signal may carry identification information corresponding to an output port of the optical packet after switching.

Optionally, the apparatus may further include a selection unit 216.

The selection unit 216 is configured to select the output port of the optical packet after switching from multiple output ports according to the identification information corresponding to the output port of the optical packet after switching, where the identification information is received by the receiving unit 211.

The parsing unit 212 is specifically configured to parse out, according to the reference optical label information and at the output port, selected by the selection unit 216, of the optical packet after switching, the actual optical label information carried in the optical label of the optical packet after switching.

The optical packet after switching parsed by the parsing unit 212 is an optical packet after switching by a primary optical packet switch or an optical packet after switching by a secondary optical packet switch.

The parsing unit 212 is specifically configured to parse out, according to the reference optical label information, actual optical label information carried in an optical label of the optical packet after switching by the primary optical packet switch.

The determining unit 213 is specifically configured to determine, according to the actual optical label information carried in the optical label of the optical packet after switching by the primary optical packet switch and the reference optical label information, whether an alarm signal corresponding to a link in the primary optical packet switch is generated.

The parsing unit 212 is further specifically configured to parse out, according to the reference optical label information, actual optical label information carried in an optical label of the optical packet after switching by the secondary optical packet switch.

The determining unit 213 is further specifically configured to determine, according to the actual optical label information carried in the optical label of the optical packet after switching by the secondary optical packet switch and the reference optical label information, whether an alarm signal corresponding to a link in the secondary optical packet switch is generated.

The sending unit 214 is further configured to: when the determining unit 213 determines that the alarm signal corresponding to the link in the primary optical packet switch is generated, send the alarm signal corresponding to the link in the primary optical packet switch to the control manager.

The sending unit 214 is further configured to: when the determining unit 213 determines that the alarm signal corresponding to the link in the secondary optical packet switch is generated, send the alarm signal corresponding to the link in the secondary optical packet switch to the control manager.

The determining unit 213 is further configured to: when the enabling signal received by the receiving unit 211 is inactive, if the actual optical label information carried in the optical label of the optical packet after switching cannot be parsed out, determine that the alarm signal is generated.

It should be noted that, for other corresponding descriptions corresponding to each functional unit in the link determining apparatus for an optical packet switching system provided in this embodiment of the present invention, reference may be made to the corresponding descriptions in FIG. 18, which are not described herein.

Figure 22:
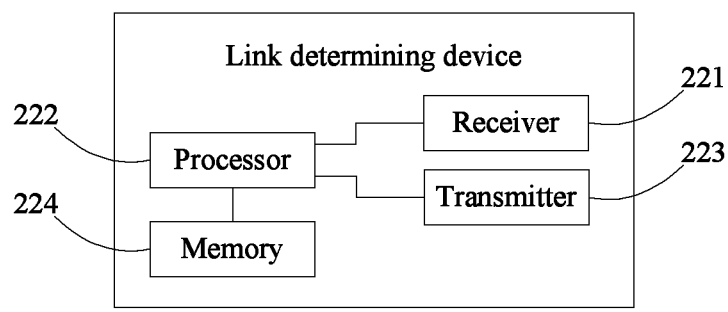
FIG. 22 is a schematic structural diagram of a link determining device according to Embodiment 4 of the present invention.

Still further, an entity of the link determining apparatus for an optical packet switching system may be a link determining device, as shown in FIG. 22. The link determining device may include a receiver 221, a processor 222, a transmitter 223, and a memory 224, where the memory 224 is connected to the processor 222.

The receiver 221 is configured to receive reference optical label information and an enabling signal that are sent by a control manager.

The processor 222 is configured to parse out, according to an information type of the reference optical label information received by the receiver 221, actual optical label information carried in an optical label of an optical packet after switching.

The processor 222 is further configured to: when the enabling signal received by the receiving unit 211 is active, determine, according to the actual optical label information and the reference optical label information that is received by the receiver 221, whether an alarm signal is generated.

The transmitter 223 is configured to: when the processor 222 determines that the alarm signal is generated, send the alarm signal to the control manager.

An information type of the actual optical label information parsed out by the processor 222 is the same as that of the reference optical label information received by the receiver 221.

The information type includes source port information, destination port information, packet length information, or priority information.

The reference optical label information received by the receiver 221 is at least one information type included in the information type.

The processor 222 is further configured to calculate a mismatch degree between the actual optical label information and the reference optical label information that is received by the receiver 221.

The processor 222 is specifically configured to determine, according to the mismatch degree between the actual optical label information and the reference optical label information, whether the alarm signal is generated.

The processor 222 is specifically configured to: when the mismatch degree between the actual optical label information and the reference optical label information is greater than a preset threshold, determine that the alarm signal is generated.

The processor 222 is further specifically configured to: when the mismatch degree between the actual optical label information and the reference optical label information is less than or equal to a preset threshold, determine that the alarm signal is not generated.

The transmitter 223 is configured to: when the processor 222 determines that the alarm signal is generated, send the alarm signal to the control manager.

The receiver 221 is further configured to receive a selection control signal sent by the control manager.

The selection control signal may carry identification information corresponding to an output port of the optical packet after switching.

The processor 222 is configured to select the output port of the optical packet after switching from multiple output ports according to the identification information corresponding to the output port of the optical packet after switching, where the identification information is received by the receiver 221.

The processor 222 is specifically configured to parse out, according to the reference optical label information and at the selected output port of the optical packet after switching, the actual optical label information carried in the optical label of the optical packet after switching.

The optical packet after switching parsed by the processor 222 is an optical packet after switching by a primary optical packet switch or an optical packet after switching by a secondary optical packet switch.

The processor 222 is specifically configured to parse out, according to the reference optical label information, actual optical label information carried in an optical label of the optical packet after switching by the primary optical packet switch.

The processor 222 is specifically configured to determine, according to the actual optical label information carried in the optical label of the optical packet after switching by the primary optical packet switch and the reference optical label information, whether an alarm signal corresponding to a link in the primary optical packet switch is generated.

The processor 222 is further specifically configured to parse out, according to the reference optical label information, actual optical label information carried in an optical label of the optical packet after switching by the secondary optical packet switch.

The processor 222 is further specifically configured to determine, according to the actual optical label information carried in the optical label of the optical packet after switching by the secondary optical packet switch and the reference optical label information, whether an alarm signal corresponding to a link in the secondary optical packet switch is generated.

The transmitter 223 is further configured to: when the processor 222 determines that the alarm signal corresponding to the link in the primary optical packet switch is generated, send the alarm signal corresponding to the link in the primary optical packet switch to the control manager.

The transmitter 223 is further configured to: when the processor 222 determines that the alarm signal corresponding to the link in the secondary optical packet switch is generated, send the alarm signal corresponding to the link in the secondary optical packet switch to the control manager.

The processor 222 is further configured to: when the enabling signal received by the receiver 221 is inactive, if the actual optical label information carried in the optical label of the optical packet after switching cannot be parsed out, determine that the alarm signal is generated.

It should be noted that, for other corresponding descriptions corresponding to each device in the link determining device provided in this embodiment of the present invention, reference may be made to the corresponding descriptions in FIG. 4, which are not described herein.

According to the link determining method, apparatus, and system for an optical packet switching system provided in the embodiments of the present invention, first, a control manager generates reference optical label information and an enabling signal, and sends the reference optical label information and the enabling signal to a link determining device; then, when the enabling signal is active, the link determining device determines, according to parsed-out actual optical label information and the received reference optical label information, whether an alarm signal is generated, and if it is determined that the alarm signal is generated, sends the alarm signal to the control manager; and finally, the control manager further determines, according to the received alarm signal, whether a link corresponding to the alarm signal is abnormal. In the prior art, a test signal before switching by an optical packet switch is coupled at a circulator at each output port of the optical packet switch, and the test signal after switching by the optical packet switch is obtained at a circulator at each input port of the optical packet switch. In comparison, it can be avoided that a test signal is coupled by using a circulator at each output port of an optical packet switch, and also be avoided that the test signal is separated at a circulator at each input port of the optical packet switch, thereby reducing optical packet switching costs.

Embodiment 5

Figure 23:
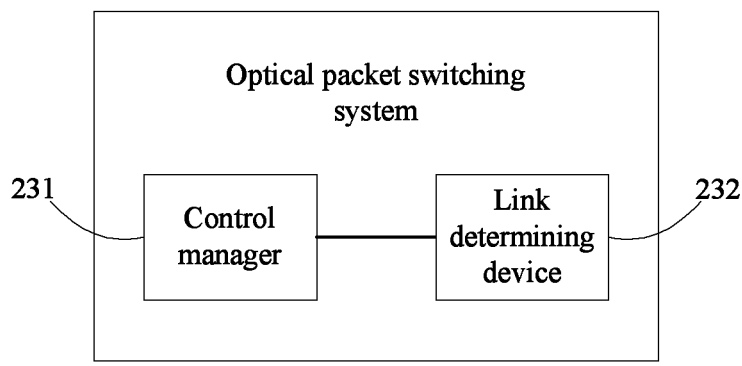
FIG. 23 is a schematic structural diagram of a link determining system for an optical packet switching system according to Embodiment 5 of the present invention.

This embodiment of the present invention provides a link determining system for an optical packet switching system, as shown in FIG. 23. The system includes a control manager 231 and a link determining device 232.

The control manager 231 is configured to parse out routing information carried in an optical label of an optical packet before switching, and generate reference optical label information and an enabling signal according to the routing information.

The control manager 231 is further configured to send the reference optical label information and the enabling signal to the link determining device 232.

The link determining device 232 is configured to receive the reference optical label information and the enabling signal that are sent by the control manager 231, and parse out, according to an information type of the reference optical label information, actual optical label information carried in an optical label of the optical packet after switching.

The link determining device 232 is further configured to: when the enabling signal is active, determine, according to the actual optical label information and the reference optical label information, whether an alarm signal is generated, and when it is determined that the alarm signal is generated, send the alarm signal to the control manager 231.

The control manager 231 is further configured to: when the enabling signal is active, determine whether the alarm signal sent by the link determining device 232 is received, and if the alarm signal sent by the link determining device 232 is received, determine, according to the alarm signal, whether a link corresponding to the alarm signal is abnormal.

According to the link determining method, apparatus, and system for an optical packet switching system provided in the embodiments of the present invention, first, a control manager generates reference optical label information and an enabling signal, and sends the reference optical label information and the enabling signal to a link determining device; then, when the enabling signal is active, the link determining device determines, according to parsed-out actual optical label information and the received reference optical label information, whether an alarm signal is generated, and if it is determined that the alarm signal is generated, sends the alarm signal to the control manager; and finally, the control manager further determines, according to the received alarm signal, whether a link corresponding to the alarm signal is abnormal. In the prior art, a test signal before switching by an optical packet switch is coupled at a circulator at each output port of the optical packet switch, and the test signal after switching by the optical packet switch is obtained at a circulator at each input port of the optical packet switch. In comparison, in the embodiments of the present invention, an optical label before switching by an optical packet switch and the optical label after switching by the optical packet switch are obtained, which can avoid that a test signal is coupled by using a circulator at each output port of the optical packet switch, and also avoid that the test signal is separated at a circulator at each input port of the optical packet switch, thereby reducing optical packet switching costs.

The link determining apparatus for an optical packet switching system provided in this embodiment of the present invention may implement the foregoing provided method embodiments. For specific function implementation, refer to descriptions in the method embodiments, which are not described herein. The link determining method, apparatus, and system for an optical packet switching system provided in the embodiments of the present invention are applicable to a case in which optical switching is applied to a network such as a data center, which is not limited thereto.

A person of ordinary skill in the art may understand that all or some of the processes of the methods in the foregoing embodiments may be implemented by a computer program instructing relevant hardware. The program may be stored in a computer readable storage medium. When the program runs, the processes of the methods in the foregoing embodiments are performed. The storage medium may include: a magnetic disk, an optical disc, a read-only memory (ROM), or a random access memory (RAM).

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A link determining method for an optical packet switching system, comprising:
   parsing out, by a control manager, routing information carried in an optical label of an optical packet before switching;
   generating, by the control manager, reference optical label information and an enabling signal according to the routing information;
   sending, by the control manager, the reference optical label information and the enabling signal to a link determining device;
   determining, by the control manager when the enabling signal is active, whether an alarm signal sent by the link determining device is received; and
   determining, by the control manager according to the alarm signal if the alarm signal sent by the link determining device is received, whether a link corresponding to the alarm signal is abnormal.

2. The link determining method for an optical packet switching system according to claim 1, wherein the reference optical label information is at least one type of information comprised in various information types of the routing information; and the various information types of the routing information comprise source port information, destination port information, packet length information, or priority information.

3. The link determining method for an optical packet switching system according to claim 1, wherein the enabling signal is used to trigger the link determining device to detect whether a link is abnormal.

4. The link determining method for an optical packet switching system according to claim 1, wherein before the step of determining, by the control manager according to the alarm signal, whether a link corresponding to the alarm signal is abnormal, the method further comprises:

if the alarm signal sent by the link determining device is received, increasing, by the control manager, a quantity of link alarm times by one; and determining, by the control manager, whether the quantity of link alarm times that is increased by one is greater than a preset threshold; and the step of determining, by the control manager according to the alarm signal, whether a link corresponding to the alarm signal is abnormal comprises:

if the quantity of link alarm times that is increased by one is greater than the preset threshold, determining, by the control manager, that the link is abnormal.

5. The link determining method for an optical packet switching system according to claim 4, wherein after the step of determining, by the control manager, that the link is abnormal, the method further comprises:

updating, by the control manager, link status information in a link status information table from normal to abnormal.

6. The link determining method for an optical packet switching system according to claim 1, wherein before the step of generating, by the control manager, reference optical label information and an enabling signal according to the routing information, the method further comprises:

determining, by the control manager, enabling signal activation duration according to the packet length information, wherein the enabling signal activation duration is used to determine a time at which the enabling signal is deactivated; and after the step of determining, by the control manager when the enabling signal is active, whether an alarm signal sent by the link determining device is received, the method further comprises:

performing, by the control manager, a zero assignment operation on the quantity of link alarm times when the enabling signal is inactive and if the alarm signal sent by the link determining device is not received.

7. The link determining method for an optical packet switching system according to claim 1, wherein the link is a link in a primary optical packet switch or a link in a secondary optical packet switch;

the step of determining, by the control manager according to the alarm signal if the alarm signal sent by the link determining device is received, whether a link corresponding to the alarm signal is abnormal comprises: if an alarm signal that corresponds to the link in the primary optical packet switch and that is sent by the link determining device is received, determining, by the control manager according to the alarm signal that corresponds to the link in the primary optical packet switch, whether the link in the primary optical packet switch is abnormal; and after the step of determining whether the link in the primary optical packet switch is abnormal, the method further comprises: if it is determined that the link in the primary optical packet switch is abnormal, sending, by the control manager, a primary/secondary selection control signal to an optical packet switch, so that the secondary optical packet switch performs optical packet switching; or if an alarm signal that corresponds to the link in the secondary optical packet switch and that is sent by the link determining device is received, determining, by the control manager according to the alarm signal that corresponds to the link in the secondary optical packet switch, whether the link in the secondary optical packet switch is abnormal.

8. The link determining method for an optical packet switching system according to claim 7, wherein after the step of determining whether the link in the primary optical packet switch is abnormal, the method further comprises:

if it is determined that the link in the primary optical packet switch is abnormal, updating, by the control manager, link status information in the link status information table from normal to that the primary optical packet switch is abnormal; or after the step of determining, by the control manager, whether the link in the secondary optical packet switch is abnormal, the method further comprises:

if it is determined that the link in the secondary optical packet switch is abnormal, updating, by the control manager, link status information in the link status information table from that the primary optical packet switch is abnormal to that the secondary optical packet switch is abnormal.

9. The link determining method for an optical packet switching system according to claim 1, wherein after the step of generating, by the control manager, reference optical label information and an enabling signal according to the routing information, the method further comprises:

generating, by the control manager, a selection control signal according to the routing information, and sending the selection control signal to the link determining device, wherein the selection control signal carries identification information corresponding to an output port of the optical packet after switching.

10. A link determining method for an optical packet switching system, comprising:

receiving, by a link determining device, reference optical label information and an enabling signal that are sent by a control manager;

parsing out, by the link determining device according to an information type of the reference optical label information, actual optical label information carried in an optical label of an optical packet after switching;

when the enabling signal is active, determining, by the link determining device according to the actual optical label information and the reference optical label information, whether an alarm signal is generated; and when it is determined that the alarm signal is generated, sending, by the link determining device, the alarm signal to the control manager.

11. The link determining method for an optical packet switching system according to claim 10, wherein an information type of the actual optical label information is the same as that of the reference optical label information.

12. The link determining method for an optical packet switching system according to claim 10, wherein the information type comprises source port information, destination port information, packet length information, or priority information; and the reference optical label information is at least one information type comprised in the information type.

13. The link determining method for an optical packet switching system according to claim 10, wherein before the step of determining, by the link determining device according to the actual optical label information and the reference optical label information, whether an alarm signal is generated, the method further comprises:

calculating, by the link determining device, a mismatch degree between the actual optical label information and the reference optical label information; and the step of determining, by the link determining device according to the actual optical label information and the reference optical label information, whether an alarm signal is generated comprises:

determining, by the link determining device according to the mismatch degree between the actual optical label information and the reference optical label information, whether the alarm signal is generated.

14. The link determining method for an optical packet switching system according to claim 13, wherein the step of determining, by the link determining device according to the mismatch degree between the actual optical label information and the reference optical label information, whether the alarm signal is generated comprises:

if the mismatch degree between the actual optical label information and the reference optical label information is greater than a preset threshold, determining, by the link determining device, that the alarm signal is generated; or if the mismatch degree between the actual optical label information and the reference optical label information is less than or equal to the preset threshold, determining, by the link determining device, that the alarm signal is not generated.

15. The link determining method for an optical packet switching system according to claim 10, wherein before the step of parsing out, by the link determining device according to an information type of the reference optical label information, actual optical label information carried in an optical label of an optical packet after switching, the method further comprises:

receiving, by the link determining device, a selection control signal sent by the control manager, wherein the selection control signal carries identification information corresponding to an output port of the optical packet after switching; and selecting, by the link determining device, the output port of the optical packet after switching from multiple output ports according to the identification information corresponding to the output port of the optical packet after switching; and the step of parsing out, by the link determining device according to an information type of the reference optical label information, actual optical label information carried in an optical label of an optical packet after switching comprises:

parsing out, by the link determining device according to the reference optical label information and at the output port of the optical packet after switching, the actual optical label information carried in the optical label of the optical packet after switching.

16. The link determining method for an optical packet switching system according to claim 10, wherein the optical packet after switching is an optical packet after switching by a primary optical packet switch or an optical packet after switching by a secondary optical packet switch;

the step of parsing out, by the link determining device according to the reference optical label information, actual optical label information carried in an optical label of an optical packet after switching comprises:

parsing out, by the link determining device according to the reference optical label information, actual optical label information carried in an optical label of the optical packet after switching by the primary optical packet switch; and the step of determining, by the link determining device according to the actual optical label information and the reference optical label information, whether an alarm signal is generated comprises:

determining, by the link determining device according to the actual optical label information carried in the optical label of the optical packet after switching by the primary optical packet switch and the reference optical label information, whether an alarm signal corresponding to a link in the primary optical packet switch is generated.

17. The link determining method for an optical packet switching system according to claim 16, wherein the step of parsing out, by the link determining device according to the reference optical label information, actual optical label information carried in an optical label of an optical packet after switching comprises:

parsing out, by the link determining device according to the reference optical label information, actual optical label information carried in an optical label of the optical packet after switching by the secondary optical packet switch; and the step of determining, by the link determining device according to the actual optical label information and the reference optical label information, whether an alarm signal is generated comprises:

determining, by the link determining device according to the actual optical label information carried in the optical label of the optical packet after switching by the secondary optical packet switch and the reference optical label information, whether an alarm signal corresponding to a link in the secondary optical packet switch is generated.

18. The link determining method for an optical packet switching system according to claim 17, wherein after the step of determining, by the link determining device according to the actual optical label information carried in the optical label of the optical packet after switching by the primary optical packet switch and the reference optical label information, whether an alarm signal corresponding to a link in the primary optical packet switch is generated, the method further comprises:

when it is determined that the alarm signal corresponding to the link in the primary optical packet switch is generated, sending, by the link determining device, the alarm signal corresponding to the link in the primary optical packet switch to the control manager; or after the step of determining, by the link determining device according to the actual optical label information carried in the optical label of the optical packet after switching by the secondary optical packet switch and the reference optical label information, whether an alarm signal corresponding to a link in the secondary optical packet switch is generated, the method further comprises:

when it is determined that the alarm signal corresponding to the link in the secondary optical packet switch is generated, sending, by the link determining device, the alarm signal corresponding to the link in the secondary optical packet switch to the control manager.

19. The link determining method for an optical packet switching system according to claim 10, wherein after the step of parsing out, by the link determining device according to the reference optical label information, actual optical label information carried in an optical label of an optical packet after switching, the method further comprises:

when the enabling signal is inactive, if the actual optical label information carried in the optical label of the optical packet after switching cannot be parsed out, determining, by the link determining device, that the alarm signal is generated.

20. A link determining system for an optical packet switching system, comprising a control manager and a link determining device, wherein the control manager is configured to parse out routing information carried in an optical label of an optical packet before switching, and generate reference optical label information and an enabling signal according to the routing information;

the control manager is further configured to send the reference optical label information and the enabling signal to the link determining device;

the link determining device is configured to receive the reference optical label information and the enabling signal that are sent by the control manager, and parse out, according to an information type of the reference optical label information, actual optical label information carried in an optical label of the optical packet after switching;

the link determining device is further configured to: when the enabling signal is active, determine, according to the actual optical label information and the reference optical label information, whether an alarm signal is generated, and when it is determined that the alarm signal is generated, send the alarm signal to the control manager; and the control manager is further configured to: when the enabling signal is active, determine whether the alarm signal sent by the link determining device is received, and if the alarm signal sent by the link determining device is received, determine, according to the alarm signal, whether a link corresponding to the alarm signal is abnormal.

* * * * *